(12) United States Patent  
Inazumi et al.

(10) Patent No.: US 10,909,672 B2  
(45) Date of Patent: Feb. 2, 2021

(54) APPEARANCE INSPECTION SYSTEM, IMAGE PROCESSING DEVICE, SETTING DEVICE, AND INSPECTION METHOD

(71) Applicant: OMRON Corporation, Kyoto (JP)

(72) Inventors: Shingo Inazumi, Kyoto (JP); Yutaka Kato, Kyoto (JP); Naoya Nakashita, Kyoto (JP)

(73) Assignee: OMRON Corporation, Kyoto (JP)

( * ) Notice: Subject to any disclaimer, the term of this patent is extended or adjusted under 35 U.S.C. 154(b) by 100 days.

(21) Appl. No.: 16/248,813

(22) Filed: Jan. 16, 2019

(65) Prior Publication Data

US 2019/0279354 A1   Sep. 12, 2019

(30) Foreign Application Priority Data

Mar. 12, 2018 (JP) ................ 2018-044036

(51) Int. Cl.
  *G06T 7/00* (2017.01)
  *H04N 5/225* (2006.01)
  (Continued)

(52) U.S. Cl.
  CPC .......... *G06T 7/0004* (2013.01); *B25J 9/1664* (2013.01); *B25J 9/1679* (2013.01);
  (Continued)

(58) Field of Classification Search
  CPC .......... G06T 7/0004; G06T 2207/30108; B25J 9/1664; B25J 9/1679; H04N 5/2259;
  (Continued)

(56) References Cited

U.S. PATENT DOCUMENTS

2007/0211240 A1   9/2007 Matsumoto et al.
2009/0190824 A1*  7/2009 Niimura ............ G01N 21/9515
                                                    382/141
(Continued)

FOREIGN PATENT DOCUMENTS

JP   2007240434   9/2007
JP   2007248241   9/2007

OTHER PUBLICATIONS

"Search Report of Europe Counterpart Application", dated Jul. 29, 2019, pp. 1-7.

*Primary Examiner* — Khai M Nguyen
(74) *Attorney, Agent, or Firm* — JCIPRNET

(57) ABSTRACT

An appearance inspection system enabling a route to be easily set when a target is imaged while causing a relative position of an imaging device with respect to the target to be different is provided. A decision part decides a plurality of relative position candidates of the imaging device with respect to the target at which focus of a lens module is possible on the inspection target position with regard to each of a plurality of the inspection target positions on the target. A selection part selects relative positions one by one from corresponding plurality of relative position candidates for each of the plurality of inspection target positions and selects a route candidate satisfying a preset requirement from a plurality of route candidates generated by sequentially connecting the plurality of selected relative positions as a designation route.

20 Claims, 17 Drawing Sheets

(51) Int. Cl.
*H04N 5/232* (2006.01)
*B25J 9/16* (2006.01)

(52) U.S. Cl.
CPC ....... *H04N 5/2259* (2013.01); *H04N 5/23296* (2013.01); *G05B 2219/37063* (2013.01); *G05B 2219/37206* (2013.01); *G05B 2219/37584* (2013.01); *G05B 2219/40463* (2013.01); *G05B 2219/40565* (2013.01); *G05B 2219/40613* (2013.01); *G06T 2207/30108* (2013.01)

(58) Field of Classification Search
CPC ...... H04N 5/23296; G05B 2219/37063; G05B 2219/37206; G05B 2219/37584; G05B 2219/40463; G05B 2219/40565; G05B 2219/40613
See application file for complete search history.

(56) References Cited

U.S. PATENT DOCUMENTS

| | | | |
|---|---|---|---|
| 2010/0023164 A1* | 1/2010 | Yoshizawa | B25J 9/1664 700/252 |
| 2013/0135490 A1* | 5/2013 | Sagisaka | H04N 5/23212 348/222.1 |
| 2015/0002725 A1* | 1/2015 | Yamasaki | H04N 5/23212 348/347 |
| 2015/0260968 A1* | 9/2015 | Ohashi | G02B 7/008 348/143 |
| 2016/0238373 A1* | 8/2016 | Featherstone | G01B 11/24 |
| 2017/0148154 A1* | 5/2017 | Nakao | G06T 7/74 |

* cited by examiner

APPEARANCE INSPECTION SYSTEM, IMAGE PROCESSING DEVICE, SETTING DEVICE, AND INSPECTION METHOD

CROSS-REFERENCE TO RELATED APPLICATION

This application claims the priority of Japan patent application serial no. 2018-044036, filed on Mar. 12, 2018. The entirety of the above-mentioned patent application is hereby incorporated by reference herein and made a part of this specification.

BACKGROUND

Technical Field

The disclosure relates to an appearance inspection system inspecting a target using a captured image, an image processing device and a setting device used in the appearance inspection system, and an inspection method.

Description of Related Art

Many appearance inspection systems inspecting targets such as resins, metals, and the like using image processing technologies have been proposed.

For example, Japanese Laid-Open No. 2007-248241 (Patent Document 1) discloses an inspection device including an imaging device that images a target, an illumination device that illuminates a field of view of the imaging device, a support device that supports a position and a posture of the target or the imaging device to be changeable, a control device that controls operations of the imaging device and the support device, and an image processing device that performs image processing to take an image generated by the imaging device under illumination of the illumination device for inspection. The control device generates setting information indicating a relation between the imaging device and the target which is satisfied at the time of imaging in imaging performed on the target a plurality of times. Japanese Laid-Open No. 2007-240434 (Patent Document 2) discloses a similar technology.

RELATED ART DOCUMENT(S)

Patent Document(S)

[Patent Document 1] Japanese Patent Application Laid-Open No. 2007-248241
[Patent Document 2] Japanese Patent Application Laid-Open No. 2007-240434

In the above-described inspection devices of the related arts, optimum setting information is set for each inspection target position of a target. However, a route of relative positions of the imaging device with respect to the target at the time of sequential imaging at the plurality of inspection target positions is not considered. When the degree of freedom of the position of the imaging device corresponding to each inspection target position is low due to various restrictions, it is difficult to set a route satisfying preset requirements.

SUMMARY

According to an embodiment of the disclosure, an appearance inspection system performs appearance inspection by imaging a target using an imaging device while causing a relative position of the imaging device with respect to the target to be different along a designation route. The imaging device includes a lens module with a variable focus position. The appearance inspection system includes a decision part, a selection part, and a lens control part. The decision part decides a plurality of relative position candidates of the imaging device with respect to the target at which focus of the lens module is possible on an inspection target position with regard to each of a plurality of inspection target positions on the target. The selection part selects relative positions one by one from corresponding plurality of relative position candidates for each of the plurality of inspection target positions and selects a route candidate satisfying a preset requirement from a plurality of route candidates generated by sequentially connecting the plurality of selected relative positions as the designation route. The lens control part controls the lens module such that a focus position is changed in accordance with the plurality of inspection target positions when the relative position of the imaging device is caused to be different along the designation route.

According to an embodiment of the disclosure, there is provided an inspection method of performing appearance inspection by imaging a target using an imaging device while causing a relative position of the imaging device with respect to the target to be different along a designation route. The imaging device includes a lens module with a variable focus position. The inspection method includes: deciding a plurality of relative position candidates of the imaging device with respect to the target at which focus of the lens module is possible on an inspection target position with regard to each of a plurality of inspection target positions on the target; selecting relative positions one by one from corresponding plurality of relative position candidates for each of the plurality of inspection target positions and selecting a route candidate satisfying a preset requirement from a plurality of route candidates generated by sequentially connecting the plurality of selected relative positions as the designation route; and controlling the lens module such that a focus position is changed in accordance with the plurality of inspection target positions when the relative position of the imaging device is caused to be different along the designation route.

DESCRIPTION OF THE EMBODIMENTS

Figure 1:
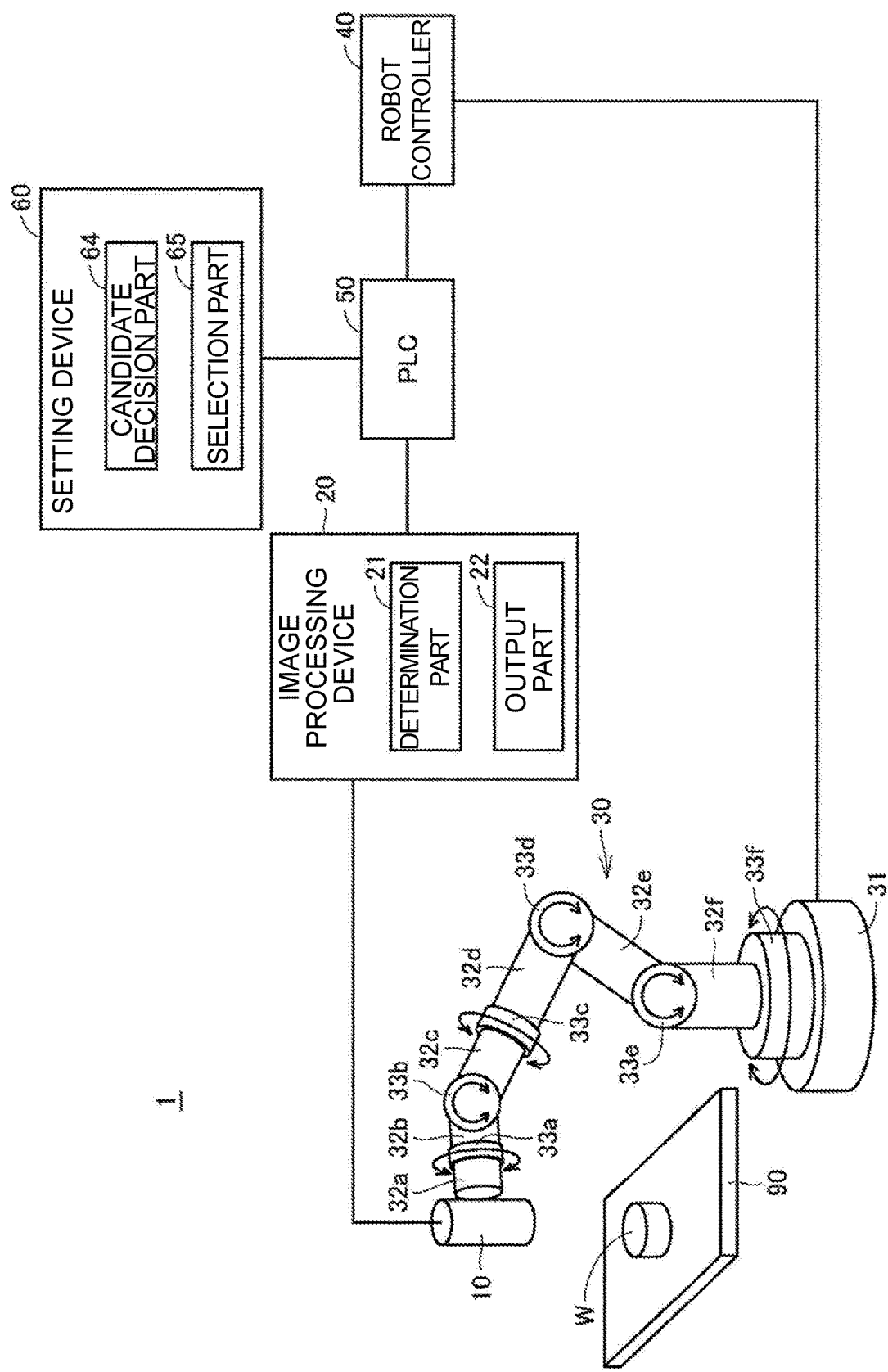
FIG. 1 is a schematic view illustrating an overview of an appearance inspection system according to an embodiment.

The disclosure provides an appearance inspection system enabling a route to be easily set when a target is imaged while causing a relative position of an imaging device with respect to the target to be different, an image processing device and a setting device used in the appearance inspection system, and an inspection method.

According to the embodiment of the disclosure, the decision part decides the position at which the focus of the lens module is possible on the inspection target position as an imaging position candidate. Therefore, the degree of freedom of the plurality of imaging position candidates is better than when a lens module with a fixed focus position is used. As a result, the selection part can generate more route candidates by connecting imaging positions selected from the plurality of imaging position candidates with the high degree of freedom. The selection part can select the route candidate satisfying a preset requirement from the many route candidates as the designation route. Therefore, it is easy to set the route when the target is imaged while causing the relative position of the imaging device with respect to the target to be different.

According to the embodiment of the disclosure, the selection part may calculate an evaluation value for evaluating whether the preset requirement is satisfied with regard to each of the plurality of route candidates and select the designation route based on the calculated evaluation value.

According to the embodiment of the disclosure, the selection part can easily set the route candidate satisfying the preset requirement as the designation route by using the evaluation value.

According to the above-described embodiment of the disclosure, the evaluation value may be calculated using an evaluation function including at least one of a term that depends on a route length of the route candidate, a term that depends on a curvature of the route candidate, a term that depends on a time necessary to change the relative position of the imaging device with respect to the target in accordance with the route candidate, and a term that depends on a derivative with respect to a time of the relative position of the imaging device with respect to the target with regard to each of the plurality of route candidates.

According to the embodiment of the disclosure, it is possible to set the designation route satisfying the requirement in consideration of at least one of the route length, the curvature, the time, and the derivative.

According to the above-described embodiment of the disclosure, a focal distance of the lens module may be variable. The lens control part may control the focal distance of the lens module such that an imaging field of view of the imaging device corresponding to each of the plurality of inspection target positions is within a pre-decided range.

According to the embodiment of the disclosure, even when the distance between the imaging position and the target is varied for each imaging position, the size of the target in the image captured by the imaging device can be substantially constant.

According to the above-described embodiment of the disclosure, with regard to each of the plurality of inspection target positions, the decision part decides the plurality of relative positions of the imaging device with respect to the target at which a pre-decided range including the inspection target positions is within an imaging field of view and focus on the inspection target positions is possible, as the plurality of relative position candidates.

According to the embodiment of the disclosure, even if any one of the plurality of imaging position candidates is selected as the imaging position, the pre-decided range including the inspection target positions is included in the captured image. As a result, it is easy to inspect the appearance of the target.

According to the above-described embodiment of the disclosure, a focal distance of the lens module is variable. With regard to each of the plurality of inspection target positions, the decision part may decide the plurality of relative positions of the imaging device with respect to the target at which focus on the inspection target position is possible when a focal distance of the lens module is set so that a pre-decided range including the inspection target position is an imaging field of view, as the plurality of relative position candidates. The lens control part may control the focal distance of the lens module such that the imaging field of view of the imaging device with respect to each of the plurality of inspection target positions is within the pre-decided range.

According to the embodiment of the disclosure, even when the distance between the imaging position and the target is varied for each imaging position, the size of the target in the image captured by the imaging device can be substantially constant.

According to the above-described embodiment of the disclosure, the appearance inspection system may further include a robot that includes a plurality of shafts and changes the relative position of the imaging device with respect to the target. The preset requirement may include a requirement that the designation route pass within a range in which the relative position of the imaging device with respect to the target is taken when only a designated shaft is used among the plurality of shafts.

According to the embodiment of the disclosure, even in a situation in which several shafts are not unfixed among the plurality of rotational shafts due to a restriction, it is possible to set the smooth designation route along which the plurality of inspection target positions are sequentially imaged.

According to the above-described embodiment of the disclosure, the appearance inspection system may further include a robot that includes a plurality of shafts and changes the relative position of the imaging device with respect to the target. The preset requirement may include at least one of a requirement that the designation route be included in a preset space and a requirement that a combination of control values of the plurality of shafts be included in a preset range when the robot changes the relative position of the imaging device with respect to the target along the designation route.

According to the embodiment of the disclosure, it is possible to set the designation route satisfying the requirement in consideration of an operation of the robot.

According to an embodiment of the disclosure, an image processing device is used in the appearance inspection system and includes: a determination part that determines quality of appearance of the target by processing images obtained by imaging a plurality of inspection target positions; and an output part that outputs a determination result of the determination part.

According to the embodiment of the disclosure, the quality of the appearance of the target is determined using the images captured along the smooth designation route and a result of the determination is output. Thus, the user can easily recognize the quality of the appearance of the target.

According to an embodiment of the disclosure, a setting device includes the determination part and the selection part. According to the embodiment of the disclosure, the setting device easily sets a designation route when the target is imaged while causing a relative position of the imaging device with respect to the target to be different.

According to the embodiment of the disclosure, it is possible to easily set a route when the target is imaged while causing the relative position of the imaging device with respect to the target to be different.

According to the disclosure, it is possible to easily set a route when the target is imaged while causing the relative position of the imaging device with respect to the target to be different.

Embodiments of the disclosure will be described in detail with reference to the drawings. The same reference signs are given to the same or equivalent portions in the drawings and the description thereof will not be repeated.

1. Application Example

First, an example of a situation in which the disclosure is applied will be described with reference to FIG. 1. FIG. 1 is a schematic view illustrating an overview of an appearance inspection system 1 according to an embodiment.

The appearance inspection system 1 according to the embodiment images a plurality of inspection target positions on a workpiece W placed on a stage 90 and inspects the appearance of the workpiece W using the obtained images in, for example, a production line or the like of an industrial product. In the appearance inspection, flaws, stains, presence or absence of foreign substances, dimensions, and the like of the workpiece W are inspected.

When the appearance inspection of the workpiece W place on the stage 90 is completed, a subsequent workpiece W is transported onto the stage 90. At this time, the workpiece W is placed at a pre-decided posture at a pre-decided position on the stage 90.

As illustrated in FIG. 1, the appearance inspection system 1 includes an imaging device 10, an image processing device 20, a robot 30, a robot controller 40, a programmable logic controller (PLC) 50, and a setting device 60.

The imaging device 10 images a subject which is within an imaging field of view in response to an instruction from the image processing device 20 to generate image data and images the workpiece W which is an appearance inspection target as a subject. The imaging device 10 includes a lens module with a variable focus position. Thus, the imaging device 10 can capture an image of which focus is on the workpiece W by changing a focus position in accordance with a distance from an inspection target position.

The robot 30 is a movement mechanism that moves the imaging device 10 and is, for example, a vertically articulated robot in which a plurality of arms 32a to 32f on a base 31 are connected. The robot 30 includes six rotational shafts 33a to 33f. The arm 32a and the arm 32b are connected by the rotational shaft 33a. The arm 32b and the arm 32c are connected by the rotational shaft 33b. The arm 32c and the arm 32d are connected by the rotational shaft 33c. The arm 32d and the arm 32e are connected by the rotational shaft 33d. The arm 32e and the arm 32f are connected by the rotational shaft 33e. The arm 32f and the base 31 are connected by the rotational shaft 33f. The imaging device 10 is mounted at the distal end of the arm 32a. The robot controller 40 controls the robot 30 such that the imaging device 10 is located at coordinate values included in an instruction from the PLC 50 and changes a relative position of the imaging device 10 with respect to the workpiece W. Further, the robot controller 40 controls the robot 30 to change the posture of the imaging device 10 with respect to the workpiece W so that an optical axis of the imaging device 10 matches in a direction included in the instruction from the PLC 50.

As described above, the workpiece W is placed at the pre-decided posture at the pre-decided position on the stage 90. Therefore, the robot 30 can change the relative position and the posture of the imaging device 10 with respect to the workpiece W by changing the relative position and the posture of the imaging device 10 with respect to the stage 90. That is, the robot 30 can change the relative position and the posture of the imaging device 10 with respect to the workpiece W by moving the imaging device 10 using a coordinate system in which a point on the stage 90 is the origin.

The PLC 50 controls the robot controller 40 and the image processing device 20 such that the imaging device 10 sequentially images the plurality of inspection target positions on the workpiece W. The PLC 50 controls the robot controller 40 such that the imaging device 10 is continuously moved along a designation route set by the setting device 60. Thus, the robot 30 continuously moves the imaging device 10 along the designation route.

Further, the PLC 50 controls the image processing device 20 such that an imaging instruction (imaging trigger) is output at a timing at which the imaging device 10 arrives at a designated imaging position. Thus, the plurality of inspection target positions can be sequentially imaged while continuously moving the imaging device 10.

The image processing device 20 outputs an imaging instruction to the imaging device 10 in response to an instruction from the PLC 50. The image processing device 20 includes a determination part 21 and an output part 22. The determination part 21 determines quality of the appearance of the workpiece W by performing a pre-decided process on the image data generated by the imaging device 10. The output part 22 outputs a determination result from the determination part 21. For example, the output part 22 causes a display part 61 included in the setting device 60 or a display device (not illustrated) to display the determination result.

The setting device 60 sets a route (designation route) of relative positions of the imaging device 10 with respect to the workpiece W to sequentially image the plurality of inspection target positions on the workpiece W. The setting device 60 sets the designation route appropriate for the workpiece W when it is necessary to inspect the appearance of a new product or a new type of workpiece W. The designation route also includes a route from a default position of the imaging device 10 to an imaging position corresponding to a first inspection target position.

As illustrated in FIG. 1, the setting device 60 includes a candidate decision part 64 and a selection part 65. With regard to each of the plurality of inspection target positions on the workpiece W, the candidate decision part 64 decides a plurality of position candidates (imaging position candidates) of the imaging device 10 at which focus of the lens module is possible on the inspection target position.

The selection part 65 generates a plurality of route candidates by selecting the imaging position one by one from corresponding plurality of imaging position candidates for each of the plurality of inspection target positions and sequentially connecting the plurality of selected imaging positions. The selection part 65 selects a route candidate satisfying preset requirements as the designation route from the plurality of route candidates.

Figure 2:
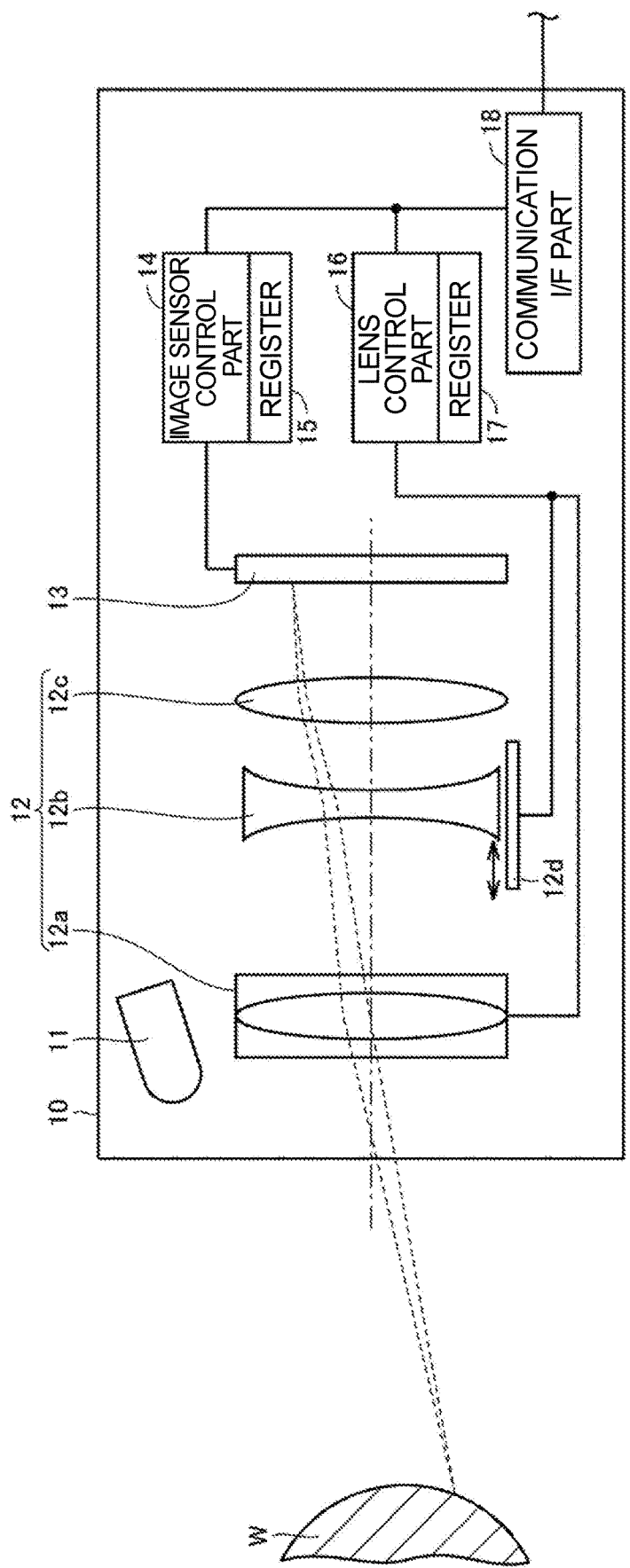
FIG. 2 is a diagram illustrating an example of an internal configuration of an imaging device illustrated in FIG. 1.

FIG. 2 is a diagram illustrating an example of an internal configuration of the imaging device 10. As illustrated in FIG. 2, the imaging device 10 includes an illumination part 11, a lens module 12, an image sensor 13, an image sensor control part 14, a lens control part 16, registers 15 and 17, and a communication I/F part 18.

The illumination part 11 radiates light to the workpiece W. The light radiated from the illumination part 11 is reflected from the surface of the workpiece W and is incident on the lens module 12.

The lens module 12 forms an image from the light reflected from the workpiece W on the image sensor 13. The lens module 12 includes a focus position adjustment lens 12a, a zoom adjustment lens group 12b, a fixed lens 12c, and a movable part 12d. The focus position adjustment lens 12a is a lens that changes a focus position. The zoom adjustment lens group 12b is a lens group that changes a focal distance. A zoom magnification is controlled by changing the focal distance. The zoom adjustment lens group 12b is installed in the movable part 12d and is movable in an optical axis direction. The fixed lens 12c is a lens that is fixed at a pre-decided position inside the imaging device 10.

The image sensor 13 is, for example, a photoelectric conversion element such as a complementary metal oxide semiconductor (CMOS) image sensor and converts light from the imaging field of view into an image signal.

The image sensor control part 14 opens a shutter (not illustrated) for exposure when an imaging instruction is received from the imaging processing device 20 via the communication I/F part 18 and generates image data based on the image signal from the image sensor 13. At this time, the image sensor control part 14 opens and closes the shutter at a shutter speed (an exposure time) corresponding to an imaging position to generate image data with a preset resolution. Information indicating the resolution and the shutter speed corresponding to the imaging position is stored in advance in the register 15. The image sensor control part 14 outputs the generated image data to the image processing device 20 via the communication I/F part 18.

The lens control part 16 controls optical characteristics of the lens module 12 in response to a command stored in the register 17. Specifically, the lens control part 16 controls the focus position adjustment lens 12a such that the focus position is changed in accordance with the inspection target position when the imaging device 10 is moved along the designation route. That is, the lens control part 16 controls the focus position adjustment lens 12a to be in focus at the inspection target position. Further, the lens control part 16 adjusts the position of the zoom adjustment lens group 12b by controlling the movable part 12d such that the size of a region included in the imaging field of view in the workpiece W is substantially constant. In other words, the lens control part 16 controls the movable part 12d such that the size of the region included in the imaging field of view in the workpiece W is within a pre-decided range. The lens control part 16 may adjust the position of the zoom adjustment lens group 12b in accordance with a distance between the imaging position and the workpiece W.

Figure 3:
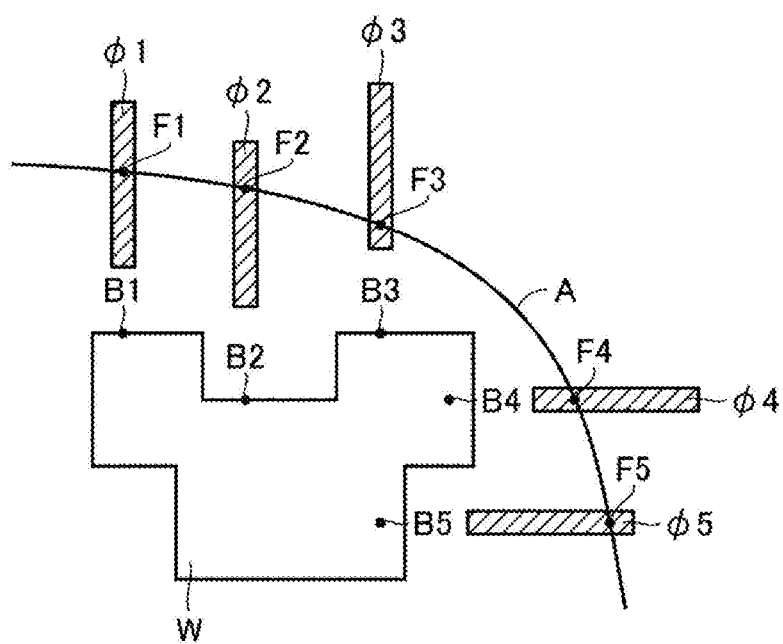
FIG. 3 is a diagram illustrating an example of a designation route set by a setting device illustrated in FIG. 1.

FIG. 3 is a diagram illustrating an example of a designation route set by the setting device 60. As illustrated in FIG. 3, the candidate decision part 64 of the setting device 60 decides imaging position candidate groups φ1 to φ5 including a plurality of imaging position candidates with respect to inspection target positions B1 to B5 of the workpiece W, respectively. In the example illustrated in FIG. 3, the selection part 65 selects a route candidate obtained by sequentially connecting imaging positions F1 to F5 respectively selected from the imaging position candidate groups φ0 to φ5 as a designation route A satisfying a preset requirement. When the position of the imaging device 10 is caused to be different along the designation route A, the lens control part 16 of the imaging device 10 controls the focus position adjustment lens 12a such that the focus position adjustment lens 12a is located at a focus position in accordance with the imaging position.

The candidate decision part 64 decides a position at which the focus of the lens module 12 can be on the inspection target position as an imaging position candidate. As described above, a focus position of the lens module 12 can be varied by the focus position adjustment lens 12a. Therefore, the degree of freedom of the imaging position candidate groups φ0 to φ5 is better than when a lens module with a fixed focus position is used.

The selection part 65 can generate more route candidates by connecting imaging positions selected from the imaging position candidate groups φ0 to φ5 with the high degree of freedom. The selection part 65 can select the route candidate satisfying a preset requirement from the many route candidates as the designation route A. Therefore, the selection part 65 easily sets the route when the target is imaged while causing the relative position of the imaging device with respect to the target to be different.

2. Specific Example

Next, an example of an appearance inspection system according to the embodiment will be described. Here, an example in which a route candidate satisfying a requirement that a maximum curvature be equal to or less than a threshold is selected as the designation route will be described. However, the preset requirement is not limited to the requirement that the curvature be the minimum and another requirement may be used. Modification examples of the preset requirement will be described later.

A. Flow of Inspection Method in Appearance Inspection System

Figure 4:
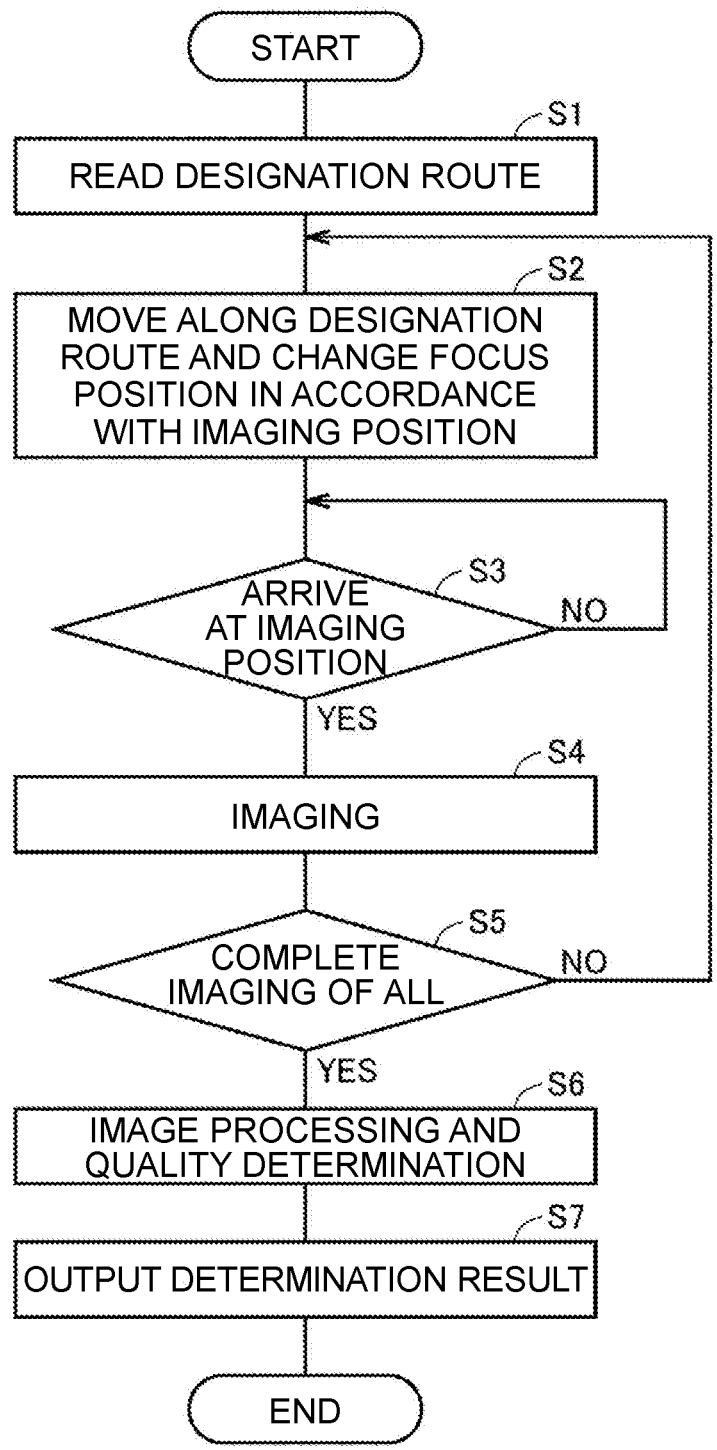
FIG. 4 is a flowchart illustrating an example of a flow of an inspection method in the appearance inspection system illustrated in FIG. 1.

FIG. 4 is a flowchart illustrating an example of a flow of an inspection method in the appearance inspection system 1. In the example illustrated in FIG. 4, the PLC 50 first reads information indicating the designation route set by the setting device 60 in step S1. The designation route is a route which passes in order through a plurality of imaging positions respectively corresponding to the plurality of inspection target positions on the work W and satisfies a preset requirement (herein, a requirement that a maximum curvature be equal to or less than a threshold). The information indicating the designation route includes XYZ coordinate values θx, θy, and θz corresponding to each point on the designation route passing for each given time and XYZ coordinate values θx, θy, and θz corresponding to each imaging position. The XYZ coordinate values are coordinate values in the XYZ coordinate system that has a point on the stage 90 as the origin. θx is an angle formed between the X axis and a line obtained by projecting the optical axis of the imaging device 10 to the XY plane, θy is an angle formed between the Y axis and a line obtained by projecting the optical axis of the imaging device 10 to the YZ plane, and θz is an angle formed between the Z axis and a line obtained by projecting the optical axis of the imaging device 10 to the ZX plane.

Subsequently, the PLC 50 outputs an instruction to move the imaging device 10 along the designation route to the robot controller 40 in step S2. Thus, the robot 30 moves the imaging device 10 along the designation route of which the maximum curvature is equal to or less than the threshold. At this time, the robot 30 also controls the posture of the imaging device 10 such that the posture becomes a posture corresponding to the imaging position. Further, the lens control part 16 of the imaging device 10 controls the focus position adjustment lens 12a such that the focus position becomes a focus position in accordance with the imaging position. That is, the focus position adjustment lens 12a is controlled such that focus is on an inspection target position corresponding to the imaging position. Further, the lens control part 16 controls the zoom adjustment lens group 12b such that the size of a region included in the imaging field of view in the work W is a pre-decided range.

Subsequently, whether the imaging device 10 arrives at the imaging position is determined in step S3. When the XYZ coordinate values of the imaging device 10 match XYZ coordinate values of the imaging position, whether the imaging device 10 arrives at the imaging position is determined. When the imaging device 10 does not arrive at the imaging position (NO in S3), the process returns to step S3. When the imaging device 10 arrives at the imaging position (YES in S3), the imaging device 10 receives an imaging instruction from the image processing device 20 and images the inspection target position of the work W in step S4.

Subsequently, in step S5, the PLC 50 determines whether the imaging of all the inspection target positions is completed. When the imaging of all the inspection target positions is not completed (NO in S5), the process returns to S2 and the movement of the imaging device 10 is continuously performed. Thereafter, steps S3 to S5 are repeated. When steps S2 to S5 are repeated, the imaging device 10 can sequentially image the plurality of inspection target positions while being moved along the designation route of which the curvature is small.

When the imaging of all the inspection target positions is completed (YES in S5), the determination part 21 of the image processing device 20 processes the images captured by the imaging device 10 and determines quality of the appearance of the work W in step S6. Subsequently, in step S7, the output part 22 of the image processing device 20 outputs a determination result.

B. Image Processing Device

The image processing device 20 includes a central processing unit (CPU), a random access memory (RAM), a read-only memory (ROM), an auxiliary storage device, and a communication I/F and performs information processing. The auxiliary storage device includes, for example, a hard disk drive, a solid-state drive, or the like and stores a program or the like to be executed by the CPU.

The determination part 21 of the image processing device 20 determines quality of the inspection target position by binarizing a differential image from an image of a good work stored in advance and comparing a reference value and the number of pixels exceeding a threshold, as disclosed in, for example, Japanese Patent Application Laid-Open No. 2007-240434. The output part 22 of the image processing device 20 displays the determination result on a display device (not illustrated). Alternatively, the image processing device 20 may display a quality result on the display part 61 included in the setting device 60.

C. Focus Position Adjustment Lens

Figure 5:
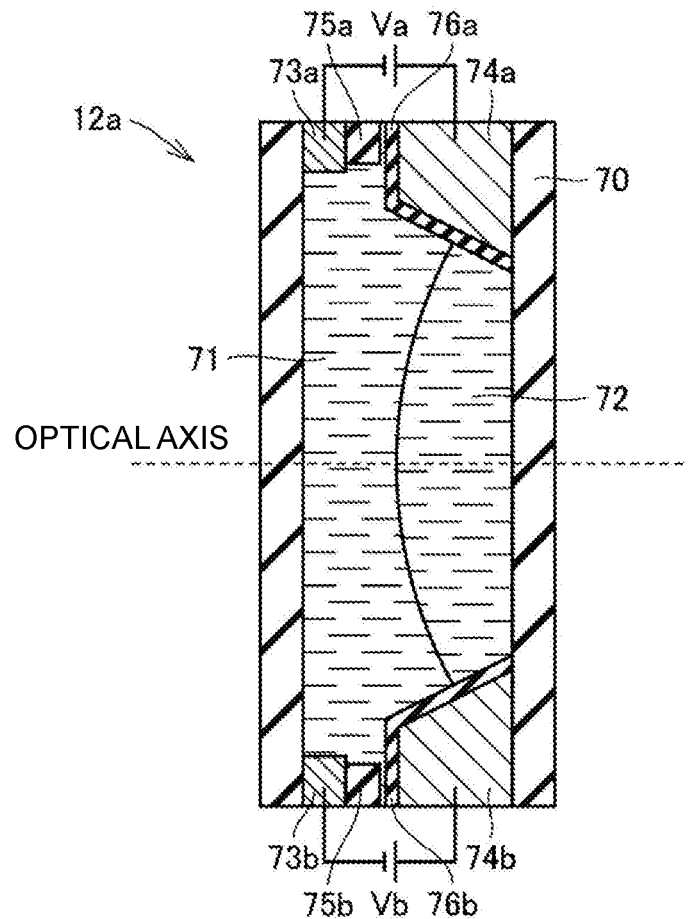
FIG. 5 is a diagram illustrating an example of a focus position adjustment lens.

FIG. 5 is a diagram illustrating an example of a focus position adjustment lens. The focus position adjustment lens 12a in the example illustrated in FIG. 5 is a liquid lens that includes a transparent container 70, electrodes 73a, 73b, 74a, and 74b, insulators 75a and 75b, and insulation layers 76a and 76b.

A closed space in the transparent container 70 is charged with a conductive liquid 71 such as water and an insulation liquid 72 such as oil. The conductive liquid 71 and the insulation liquid 72 are not mixed and have mutually different refractive indexes.

The electrodes 73a and 73b are fixed between the insulators 75a and 75b and the transparent container 70, respectively, and are located in the conductive liquid 71.

The electrodes 74a and 74b are disposed near an end of an interface between the conductive liquid 71 and the insulation liquid 72. The insulation layer 76a is interposed between the insulation liquid 72 and the conductive liquid 71 and the electrode 74a. The insulation layer 76b is interposed between the insulation liquid 72 and the conductive liquid 71 and the electrode 74b. The electrodes 74a and 74b are disposed at a position symmetric to an optical axis of the focus position adjustment lens 12a.

When a voltage Va is applied between the electrodes 74a and 73a, the conductive liquid 71 is pulled by the electrode 74a. Similarly, when a voltage Vb is applied between the electrodes 74b and 73b, the conductive liquid 71 is pulled by the electrode 74b. Thus, a curvature of the interface between the conductive liquid 71 and the insulation liquid 72 is changed. Since the refractive indexes of the conductive liquid 71 and the insulation liquid 72 are different, a focus position of the focus position adjustment lens 12a is changed when the curvature of the interface between the conductive liquid 71 and the insulation liquid 72 is changed. The curvature of the interface depends on magnitudes of the voltages Va and Vb. Therefore, by changing the magnitudes of the voltages Va and Vb, it is possible to adjust the focus position of the focus position adjustment lens 12a to a desired position.

Normally, the voltages Va and Vb are controlled to an equal value. Thus, the interface between the conductive liquid 71 and the insulation liquid 72 is changed to be symmetric to the optical axis. However, the voltages Va and Vb may be controlled to different values. Thus, the interface between the conductive liquid 71 and the insulation liquid 72 may be asymmetric to the optical axis and a direction of the imaging field of view of the imaging device 10 can be changed.

Figure 6:
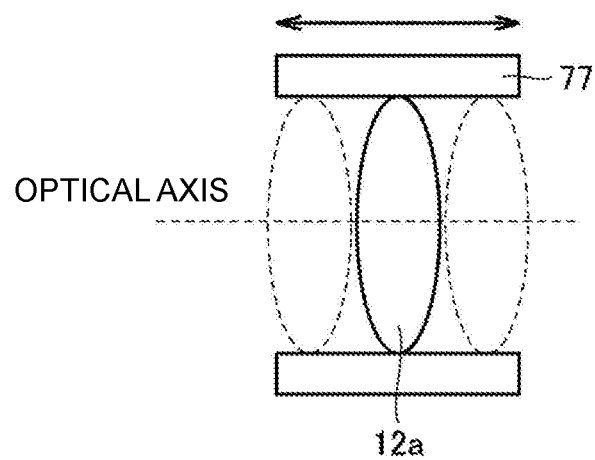
FIG. 6 is a diagram illustrating another example of the focus position adjustment lens.

FIG. 6 is a diagram illustrating another example of the focus position adjustment lens 12a. The focus position adjustment lens 12a in the example illustrated in FIG. 5 is supported by a slide member 77 parallel to the optical axis to be movable along the slide member 77. By changing the position of the focus position adjustment lens 12a, it is possible to adjust the focus position of the focus position adjustment lens 12a to a desired position.

D. Internal Configuration of Setting Device

Figure 7:
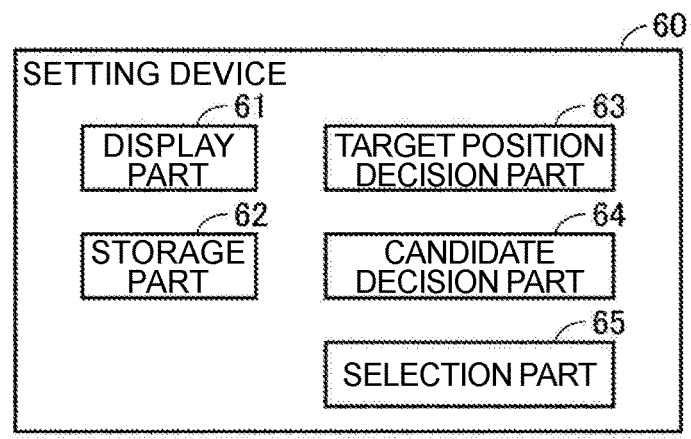
FIG. 7 is a block diagram illustrating an example of an internal configuration of the setting device.

FIG. 7 is a block diagram illustrating an example of an internal configuration of the setting device 60. In the example illustrated in FIG. 7, the setting device 60 further includes a display part 61, a storage part 62, and a target position decision part 63 in addition to the candidate decision part 64 and the selection part 65. The display part 61 is, for example, a touch panel. The storage part 62 is, for example, an auxiliary storage device such as a hard disk drive or a solid-state drive and stores processing programs to be executed by the target position decision part 63, the candidate decision part 64, and the selection part 65, data indicating information regarding setting of the designation route, and the like.

The target position decision part 63 reads 3-dimensional design data (for example, computer-aided design (CAD) data) indicating the designed surface of the work W stored in the storage part 62 and decides a plurality of inspection target positions on the surface indicated by the 3-dimensional setting data in accordance with an input by a user. The target position decision part 63 causes the display part 61 to display a schematic diagram of the work W indicated by the 3-dimensional design data and receives a designation input of the inspection target position from the user.

The candidate decision part 64 decides candidates of a position (imaging position) (hereinafter referred to as "imaging position candidates") of the imaging device 10 capable of performing imaging in focus on the inspection target positions with regard to each of the plurality of inspection target positions. The candidate decision part 64 decides the plurality of imaging position candidates with regard to each of the plurality of inspection target positions.

The selection part 65 selects one imaging position from the plurality of corresponding imaging position candidates with regard to each of the plurality of inspection target positions. The selection part 65 generates route candidates of the imaging device 10 by sequentially connecting the plurality of imaging positions selected with regard to the plurality of inspection target positions. The selection part 65 generates the plurality of route candidates. The selection part 65 calculates an evaluation value for evaluating a maximum curvature of the route for each of the generated route candidates and selects one route candidate as a designation route from the plurality of route candidates based on the calculated evaluation value. The selection part 65 may display the selected designation route on the display part 61.

E. Hardware Configuration of Setting Device

Figure 8:
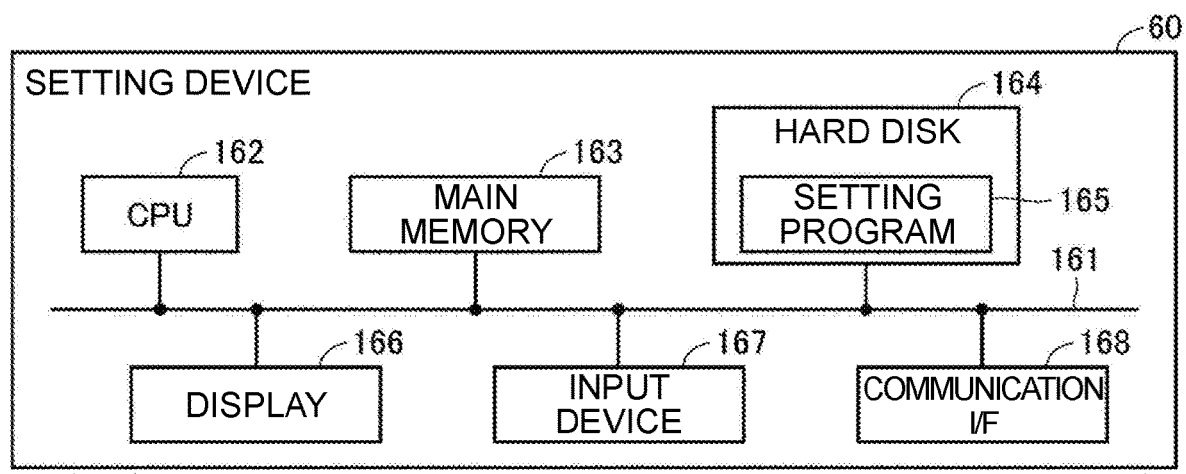
FIG. 8 is a schematic diagram illustrating a hardware configuration of the setting device.

FIG. 8 is a schematic diagram illustrating a hardware configuration of the setting device 60. The setting device 60 includes a central processing unit (CPU) 162, a main memory 163, a hard disk 164, a display 166, an input device 167, and a communication interface (I/F) 168. These parts are connected to be able to mutually perform data communication via a bus 161.

The CPU 162 performs various arithmetic calculations by loading programs (codes) including the setting program 165 installed in the hard disk 164 on the main memory 163 and executing the programs in a predetermined order. The main memory 163 is generally a volatile storage device such as a dynamic random access memory (DRAM).

The hard disk 164 is an internal memory included in the setting device 60 and is a nonvolatile storage device and stores various programs such as the setting program 165. A semiconductor storage device such as a flash memory may be adopted in addition to or instead of the hard disk 164.

The setting program 165 is a program indicating a procedure in which the route is set by the setting device 60. Various programs such as the setting program 165 may not be necessarily stored in the hard disk 164 and may be stored in a server that can communicate with the setting device 60 or an external memory which can be directly connected to the setting device 60. For example, various programs to be executed in the external memory in the setting device 60 and various parameters to be used in the various programs are distributed in a stored state, and the setting device 60 reads the various programs and the various parameters from the external memory. The external memory is a medium that stores information such a program recorded on a computer, another device, a machine, or the like by an electric, magnetic, optical, mechanical, or chemical target operation so that the information is readable. Alternatively, programs or parameters downloaded to a server or the like which is connected to be communicable with the setting device 60 may be installed in the setting device 60.

The display 166 is, for example, a liquid crystal display. The input device 167 includes, for example, a mouse, a keyboard, a touchpad, or the like.

The communication I/F 168 exchanges various kinds of data between the PLC 50 and the CPU 162. The communication I/F 168 may exchange data between the server and the CPU 162. The communication I/F 168 includes hardware corresponding to a network for exchanging various kinds of data with the PLC 50.

The display part 61 illustrated in FIG. 7 includes the display 166. The storage part 62 illustrated in FIG. 7 includes the main memory 163 or the hard disk 164. The target position decision part 63, the candidate decision part 64, and the selection part 65 illustrated in FIG. 7 are realized by the CPU 162, the main memory 163, and the hard disk 164.

The setting program 165 according to the embodiment may be embedded in a part of another program to be provided. Instead, some or all of the processes provided by executing the setting program 165 may be performed by a dedicated hardware circuit.

F. Flow of Example of Process in Setting Device

Figure 9:
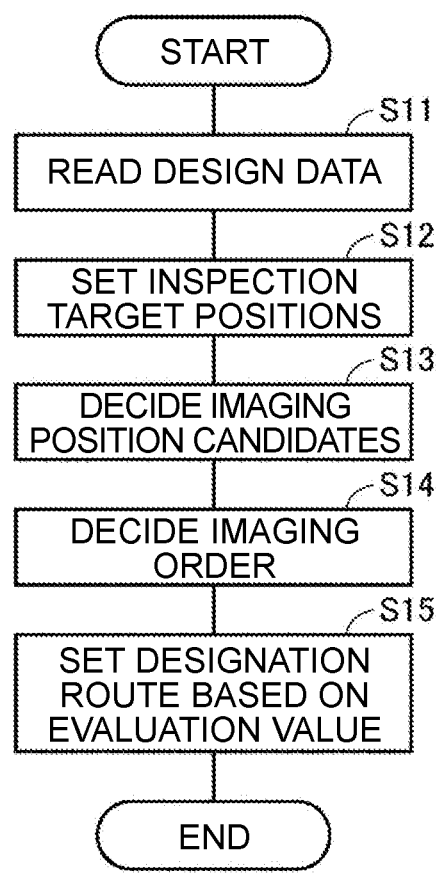
FIG. 9 is a flowchart illustrating an example of a flow of a process in the setting device.

FIG. 9 is a flowchart illustrating an example of a flow of a process in the setting device 60. When it is necessary for the appearance inspection system 1 to inspect the appearance of a new product or a new type of work W, the setting device 60 performs a process in accordance with, for example, the flowchart illustrated in FIG. 9 to set a designation route of the imaging device 10 appropriate for the new product or the new type of work W. The storage part 62 may store 3-dimensional design data indicating the designed surface of the new product or the new type of work W in advance.

In the example illustrated in FIG. 9, the target position decision part 63 first reads the 3-dimensional design data from the storage part 62 in step S11. Subsequently, in step S12, the target position decision part 63 displays the schematic diagram of the designed appearance of the work W indicated by the 3-dimensional design data on the display part 61 and decides a plurality of inspection target positions on the work W in accordance with an input by the user.

Subsequently, in step S13, the candidate decision part 64 decides a plurality of imaging position candidates with regard to each of the plurality of inspection target positions. Subsequently, in step S14, the selection part 65 decides an imaging order of the plurality of inspection target positions.

Subsequently, in step S15, the selection part 65 sets the designation route using the evaluation value. Specifically, the selection part 65 generates route candidates of the imaging device 10 by selecting the imaging positions one by one from corresponding plurality of imaging position candidates for each of the plurality of inspection target positions and connecting the plurality of selected imaging positions in the imaging order decided in step S14. The selection part 65 selects one of the plurality of route candidates calculated for each route candidate as the designation route based on the evaluation value indicating the maximum curvature. For example, the selection part 65 selects the route candidate in which the evaluation value is equal to or less than the threshold as the designation route. When there are a plurality of route candidates in which the evaluation values are equal to or less than the threshold, the selection part 65 selects the route candidate in which the evaluation value is the minimum as the designation route. Thus, when the process ends, the designation route in which the maximum curvature is equal to or less than the threshold is set.

Figure 10:
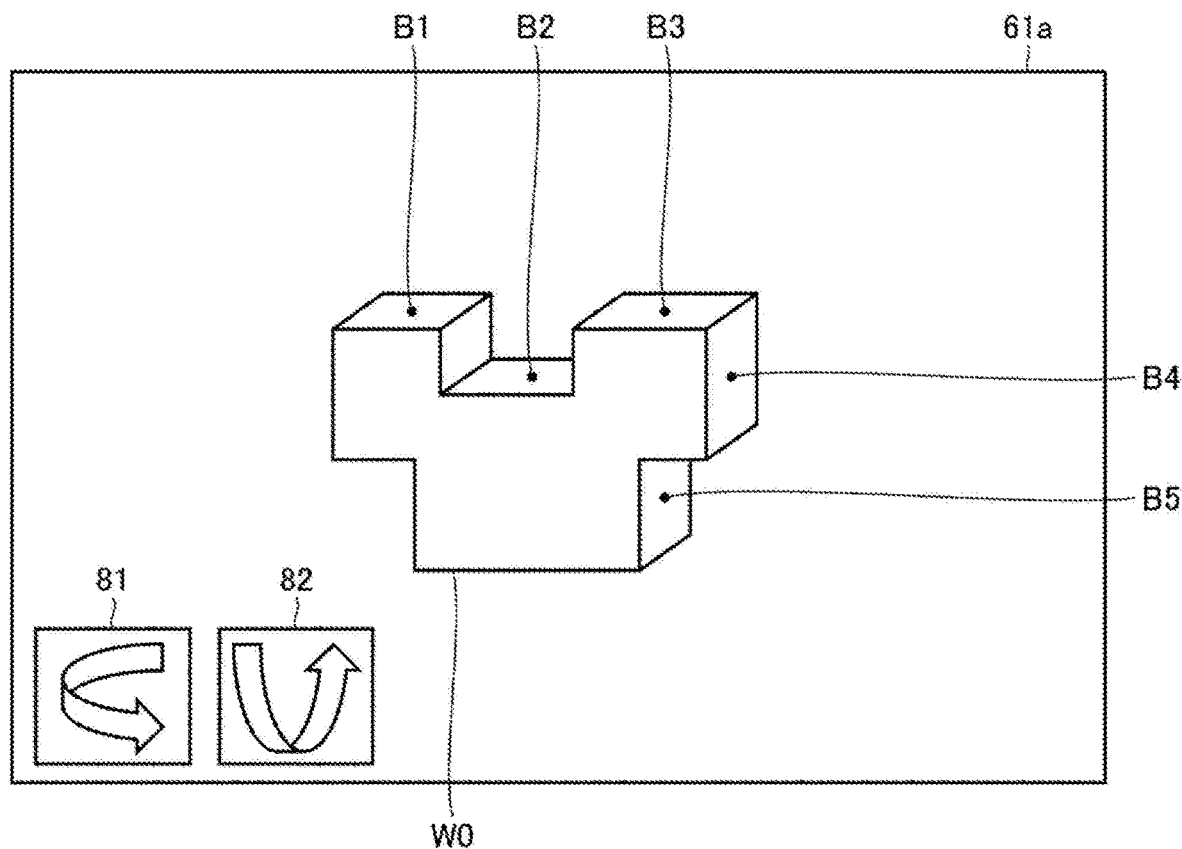
FIG. 10 is a diagram illustrating an example of a screen showing a schematic diagram illustrating a designed appearance of a workpiece.

G. Method of Deciding Inspection Target Position by Target Position Decision Part An example of a method of deciding an inspection target position by the target position decision part 63 will be described with reference to FIG. 10. FIG. 10 is a diagram illustrating an example of a screen showing a schematic diagram of a designed appearance of the work W.

As illustrated in FIG. 10, the target position decision part 63 causes the display part 61 to display a screen 61a including a schematic diagram W0 of the designed appearance indicated by the 3-dimensional design data of the work W. The screen 61a includes a tool button 81 for rotating the schematic diagram W0 using the vertical direction as an axis and a tool button 82 for rotating the schematic diagram W0 using the horizontal direction as an axis. The user can appropriately rotate the schematic diagram W0 by operating the tool buttons 81 and 82.

The target position decision part 63 receives a designation of a position which the user desires to inspect. Specifically, the user uses the input device 167 to click a plurality of points which the user desires to inspect on the schematic diagram W0 of the work W. The target position decision part 63 decides the plurality of points designated on the schematic diagram W0 as a plurality of inspection target positions and requests coordinates of the plurality of inspection target positions. In the example illustrated in FIG. 10, inspection target positions B1 to B5 are decided.

The target position decision part 63 converts a coordinate system of the 3-dimensional design data into an XYZ coordinate system that has a point on the stage 90 as the origin on the premise that the work W is placed at a posture decided in advance at a position decided in advance on the stage 90. Therefore, the inspection target position indicates XYZ coordinate values of the XYZ coordinate system that has the point on the stage 90 as the origin.

Figure 11:
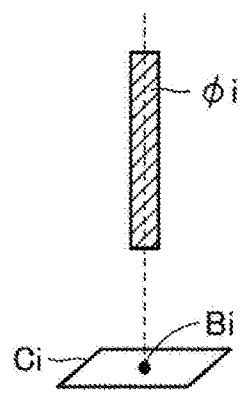
FIG. 11 is a diagram illustrating an example of a positional relation between an inspection target position and an imaging position candidate group.
Figure 12:
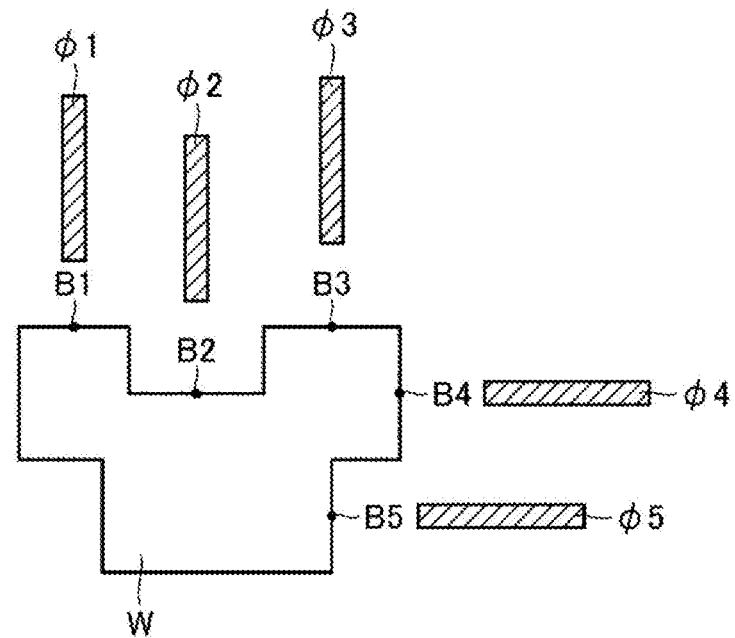
FIG. 12 is a diagram illustrating an example of an imaging position candidate group corresponding to each of a plurality of inspection target positions illustrated in FIG. 10.

H. Method of Deciding Imaging Position Candidates by Candidate Decision Part An example of a method of deciding an imaging position candidate by the candidate decision part 64 will be described with reference to FIGS. 11 and 12. FIG. 11 is a diagram illustrating an example of a positional relation between an inspection target position and an imaging position candidate group. FIG. 12 is a diagram illustrating an example of imaging position candidate group corresponding to each of a plurality of inspection target positions illustrated in FIG. 10.

As illustrated in FIG. 11, the candidate decision part 64 decides a plurality of positions within a range satisfying Conditions (1) to (4) below as imaging position candidates with regard to an inspection target position B1. FIG. 11 illustrates a range of an imaging position candidate group φi formed by the plurality of decided imaging position candidates:

Condition (1): a normal line of the surface of the work W passing through the inspection target position Bi or a line inclined by a predetermined angle (for example, 20°) from the normal line. The predetermined angle is set appropriately in accordance with disposition or the like of the illumination part 11, the lens module 12, and the image sensor 13 in the imaging device 10;

Condition (2): an image in focus to the inspection target position Bi can be captured by adjusting a focus position by the focus position adjustment lens 12a;

Condition (3): within a movable range by the robot 30; and

Condition (4): a range Ci with a predetermined size including the inspection target position Bi can be set as an imaging field of view by adjusting the focal distance by the zoom adjustment lens group 12b.

The candidate decision part 64 may decide each of a plurality (finite number) of positions arranged at given intervals as an imaging position candidate within the range satisfying Conditions (1) to (4).

The candidate decision part 64 decides the imaging position candidate in accordance with the posture of the imaging device 10 to face the corresponding inspection target position in association with each imaging position candidate.

The imaging position candidate is represented by XYZ coordinate values of the XYZ coordinate system that has a point on the stage 90 as the origin. A posture of the imaging device 10 is represented by parameters θx, θy, and θz for specifying a direction of the optical axis of the imaging device 10.

The candidate decision part 64 decides the foregoing imaging position candidate group with regard to each of the plurality of inspection target positions. In the example illustrated in FIG. 12, the imaging position candidate groups ϕ1 to ϕ5 are decided for the inspection target positions B1 to B5 illustrated in FIG. 10. Since the focus position of the lens module 12 is variable and the imaging position candidate is decided so that Condition (2) above is satisfied, the range of the imaging position candidate groups ϕ1 to ϕ5 is broadened. In particular, the range of the imaging position candidate groups ϕ1 to ϕ5 is broadened in the normal line direction of the surface of the work W. Broadening the range of the imaging position candidate groups ϕ1 to ϕ5 means improving the degree of freedom of the imaging position.

I. Method of Deciding Imaging Order by Selection Part

The selection part 65 decides, for example, an imaging order of the inspection target positions B1 to B5 in the following procedure. The selection part 65 sets the inspection target position B1 closest to a default position of the imaging device 10 among the inspection target positions B1 to B5 as a first inspection target position. The selection part 65 sets the inspection target position B2 closest to the first inspection target position as a second inspection target position along the surface of the work W. The selection part 65 sets the inspection target position B3 closest to the inspection target position B2 as a third inspection target position along the surface of the work W among the remaining inspection target positions. The selection part 65 sets the inspection target position B4 closest to the inspection target position B3 as a fourth inspection target position along the surface of the work W among the remaining inspection target positions. The selection part 65 sets the remaining inspection target position B5 as a fifth inspection target position. A method of deciding the imaging order of the inspection target positions is not limited to this method and may be a decision method in accordance with various geometrical conditions or a method in accordance with user designation.

J. Method of Selecting Destination Route by Selection Part

Figure 13:
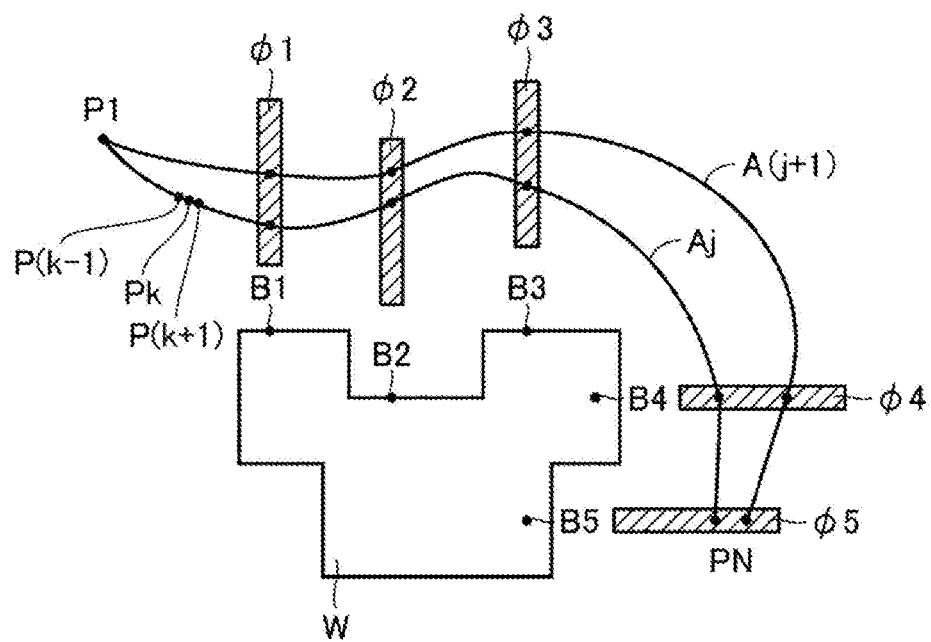
FIG. 13 is a diagram illustrating examples of route candidates generated by a selection part.

An example of a method of selecting the designation route by the selection part 65 will be described with reference to FIG. 13. FIG. 13 is a diagram illustrating examples of route candidates generated by the selection part 65.

The selection part 65 selects the imaging positions one by one from the corresponding imaging position candidate groups ϕ1 to ϕ5 for each of the inspection target positions B1 to B5 and generates a route candidate Aj passing the selected five imaging positions from the default position in the imaging order. As patterns (selection patterns) in which the imaging positions are selected one by one from the imaging position candidate groups ϕ1 to ϕ5, there are M1×M2×M3×M4×M5 when the numbers of imaging position candidates included in the imaging position candidate groups ϕ0 to ϕ5 are M1 to M5, respectively. Therefore, the selection part 65 generates M1×M2×M3×M4×M5 route candidates.

The selection part 65 generates one route candidate by connecting the five imaging positions as follows for each of the M1×M2×M3×M4×M5 selection pattern. P1 to PN (where N is a positive integer) are a plurality of points for each given distance d from a starting point to an ending point on the route candidate. The point P1 is a default position of the imaging device 10 and a starting point of the designation route. The point PN is an ending point of the designation route. A point Pk (where k=2 to N) is a point advanced by k multiples of the given distance d from the point P1. The selection part 65 calculates an evaluation value E indicating a maximum curvature for the route candidate. The evaluation value E is calculated with an evaluation function that includes a term indicating a maximum value of the curvature at the points P1 to PN. Specifically, the selection part 65 calculates a reciprocal of the radius of a circle passing a point P(k−1), the point Pk, and a point P(k+1) as a curvature of the point Pk and calculates a maximum value of the curvature of a point P2 to a point P(N−1) as the evaluation value E. The selection part 65 generates a route candidate in which the evaluation value E is equal to or less than a threshold.

The selection part 65 selects the route candidate indicating the minimum evaluation value E as the designation route among the M1×M2×M3×M4×M5 route candidates generated in the foregoing way. The selection part 65 generates information indicating the selected designation route. The information indicating the designation route includes the XYZ coordinates of each imaging position, θx, θy, and θz indicating a posture of the imaging device 10 corresponding to the imaging position, and the XYZ coordinate values and θx, θy, and θz corresponding to the points P1 to PN on the designation route (each point on the designation route passing for each given time). The selection part 65 may decide θx, θy, and θz indicating a posture of the imaging device 10 at each point between an i-th imaging position and an i+1-th imaging position in the designation route by interpolation calculation using θxi, θyi, and θzi corresponding to the i-th imaging position and θx(i+1), θy(i+1), and θz(i+1) corresponding to the i+1-th imaging position.

Figure 14:
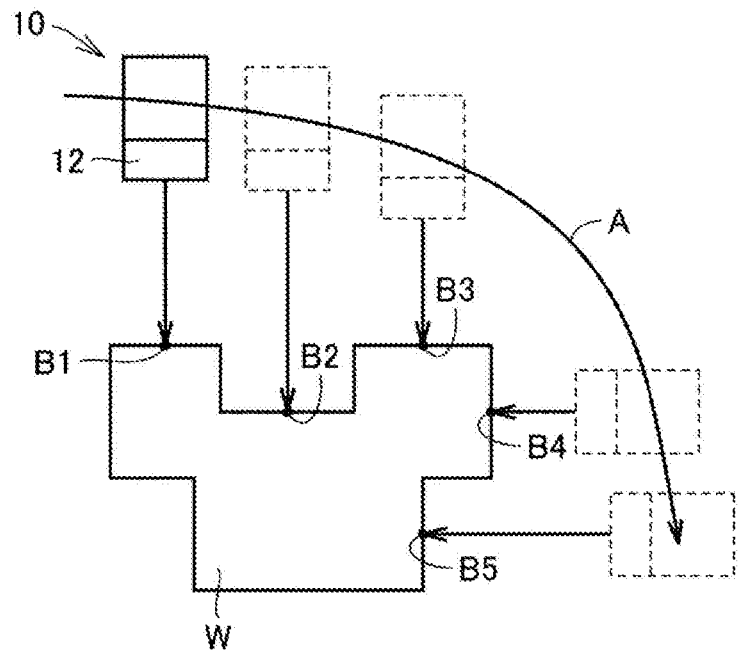
FIG. 14 is a diagram illustrating an example of a designation route selected by the selection part.
Figure 15:
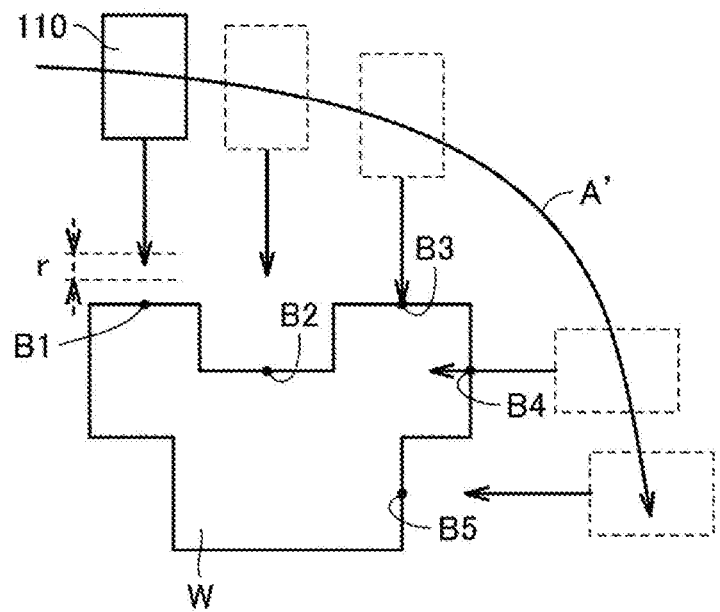
FIG. 15 is a diagram illustrating an example of a designation route when an imaging device with a fixed focus position is used.
Figure 16:
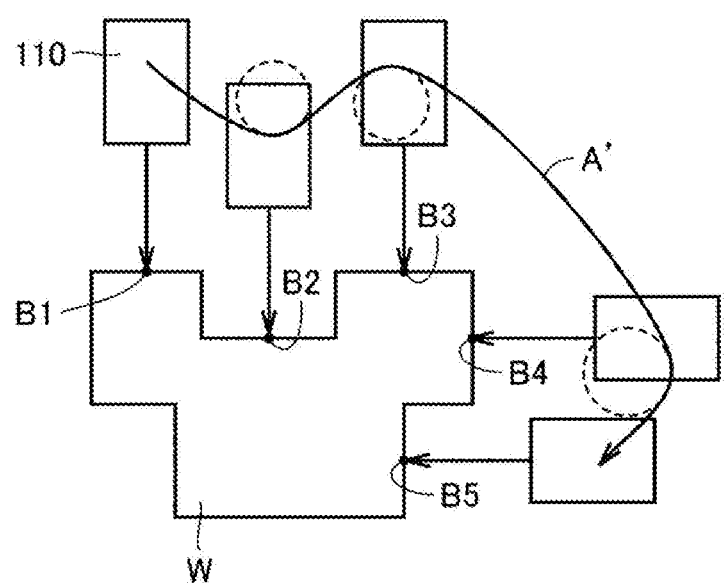
FIG. 16 is a diagram illustrating another example of the designation route when the imaging device with the fixed focus position is used.

FIG. 14 is a diagram illustrating an example of a designation route selected by the selection part 65. FIG. 15 is a diagram illustrating an example of a designation route when the imaging device 110 with a fixed focus position is used. FIG. 16 is a diagram illustrating another example of the designation route when the imaging device 110 with the fixed focus position is used.

When the imaging device 110 is moved along a designation route A' of FIG. 15 in which the maximum curvature is equal to or less than a threshold, a distance between the imaging device 110 and the work W with an unevenness is changed. Therefore, when the surface of the work W is not located within a range in which focus of the imaging device 110 is adjusted (a range indicated by a reference sign r in the drawing), an image which is not in focus on the surface of the work W is captured.

To obtain an image which is in focus on the work W, as illustrated in FIG. 16, the designation route A' obtained by smoothly connecting each photographing position using a spline or the like is considered to be obtained. However, a curvature near the imaging positions corresponding to the inspection target positions B2 to B4 increases. That is, a radius of a circle of curvature (radius of curvature) indicated by a dotted line in FIG. 16 decreases. Therefore, it is difficult to avoid a large value of the maximum curvature.

As illustrated in FIG. 14, however, the focus position of the lens module 12 is variable and the imaging position candidate groups ϕ1 to ϕ5 with the degree of high freedom are decided. Therefore, the selection part 65 easily selects the designation route A in which the maximum curvature is equal to or less than the threshold. Further, since the lens module 12 is controlled such that the focus position is changed in accordance with the inspection target positions B1 to B5, an image in focus can be obtained at each of the inspection target positions B1 to B5.

K. Flow of Another Example of Process in Setting Device

The setting device 60 may set the designation route so that optional conditions designated by the user may be satisfied. For example, the setting device 60 sets the designation route so that the following optional conditions a to c are satisfied:

Optional condition a: a route of movement in a movement mode (for example, a straight shape or an arc shape) designated between two imaging positions corresponding to two inspection target positions designated among the plurality of inspection target positions;

Optical condition b: a route of movement of the imaging device 10 in a state in which only some of the shafts designated among the rotational shafts 33a to 33f of the robot 30 are rotatable (unfixed) and the remaining shafts are fixed; and Optical condition c: a route of movement of the imaging device 10 only within a designated range.

When the user desires to move the imaging device 10, for example, in accordance with the shape of the work W, the optional condition a is validated. The user validates the optional condition b, for example, when some of the shafts are defective and it is necessary to operate the robot 30 in which the shafts are fixed. The user validates the optical condition c so that the imaging device 10 does not interfere in an obstacle object, for example, when there is the obstacle object within a movable range of the imaging device 10.

Figure 17:
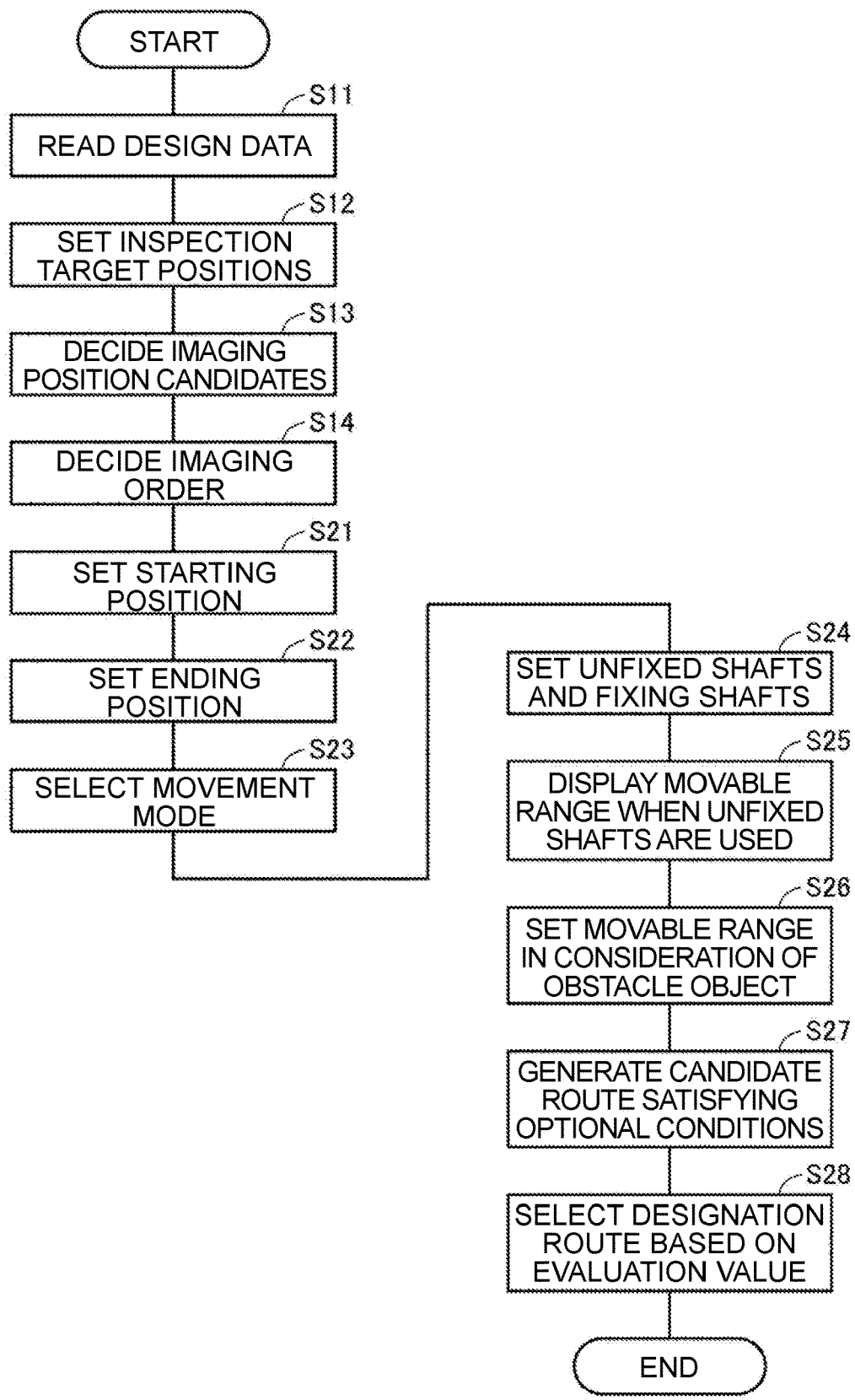
FIG. 17 is a flowchart illustrating another example of the flow of the process in the setting device.

FIG. 17 is a flowchart illustrating another example of the flow of the process in the setting device 60. The example illustrated in FIG. 17 shows a flow of a process when all of the optional conditions a to c are valid.

First, as in the example illustrated in FIG. 9, steps S11 to S14 are performed, and a plurality of inspection target positions, an imaging position candidate group corresponding to each of the plurality of inspection target positions, and an imaging order of the plurality of inspection target positions are decided.

Subsequently, in step S21, the selection part 65 sets a starting position of a section in which the movement mode of the imaging device 10 is designated among the plurality of inspection target positions. The selection part 65 sets the starting position in accordance with, for example, a user input.

Subsequently, in step S22, the selection part 65 sets an ending position of the section in which the movement mode of the imaging device 10 is designated among the plurality of inspection target positions. The selection part 65 sets the ending position in accordance with, for example, a user input.

Subsequently, in step S23, the selection part 65 sets the movement mode of the imaging device 10 from the imaging position corresponding to the starting position to the imaging position corresponding to the ending position. The selection part 65 sets the movement mode in accordance with, for example, a user input. Examples of the movement mode include a straight shape and an arch shape. Steps S21 to S23 are processes of setting the optional condition a.

Figure 18:
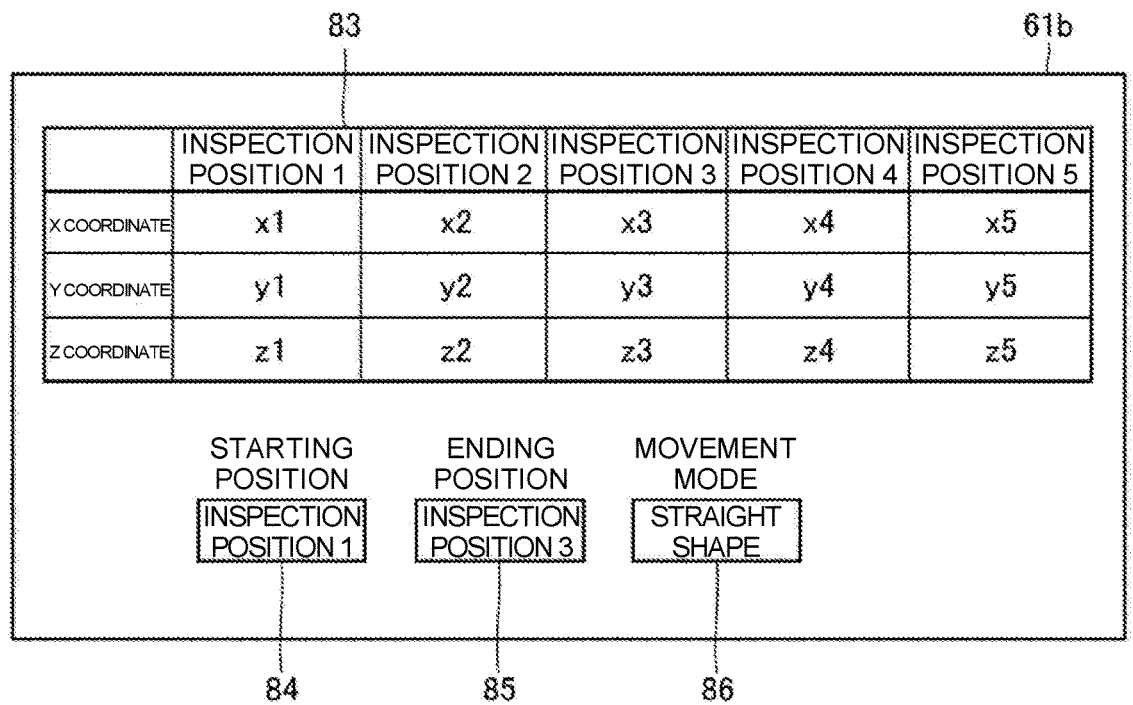
FIG. 18 is a diagram illustrating an example of a screen displayed when an option condition a is set.

FIG. 18 is a diagram illustrating an example of a screen displayed when the option condition a is set. The selection part 65 displays a screen 61b including a table 83 in which the XYZ coordinate values of the plurality of inspection target positions are arranged in the imaging order decided in step S14, an input field 84 for prompting an input of the starting position, an input field 85 for prompting an input of the ending position, and an input field 86 for prompting an input of the movement mode on the display part 61. The selection part 65 sets the starting position, the ending position, and the movement mode in accordance with information input in the input fields 84 to 86.

Referring back to FIG. 17, subsequently, in step S24, the selection part 65 sets the fixed shafts among the rotational shafts 33a to 33f included in the robot 30. The selection part 65 sets the fixed shafts and the unfixed shafts (moving shafts) in accordance with a user input. Step S24 is a process of setting the optional condition b.

Subsequently, in step S25, the selection part 65 sets a movable range D0 of the imaging device 10 when the work W can be imaged and only the shafts set to be unfixed in step S24 are used. At this time, the selection part 65 displays a screen indicating the set movable range D0 on the display part 61.

Figure 19:
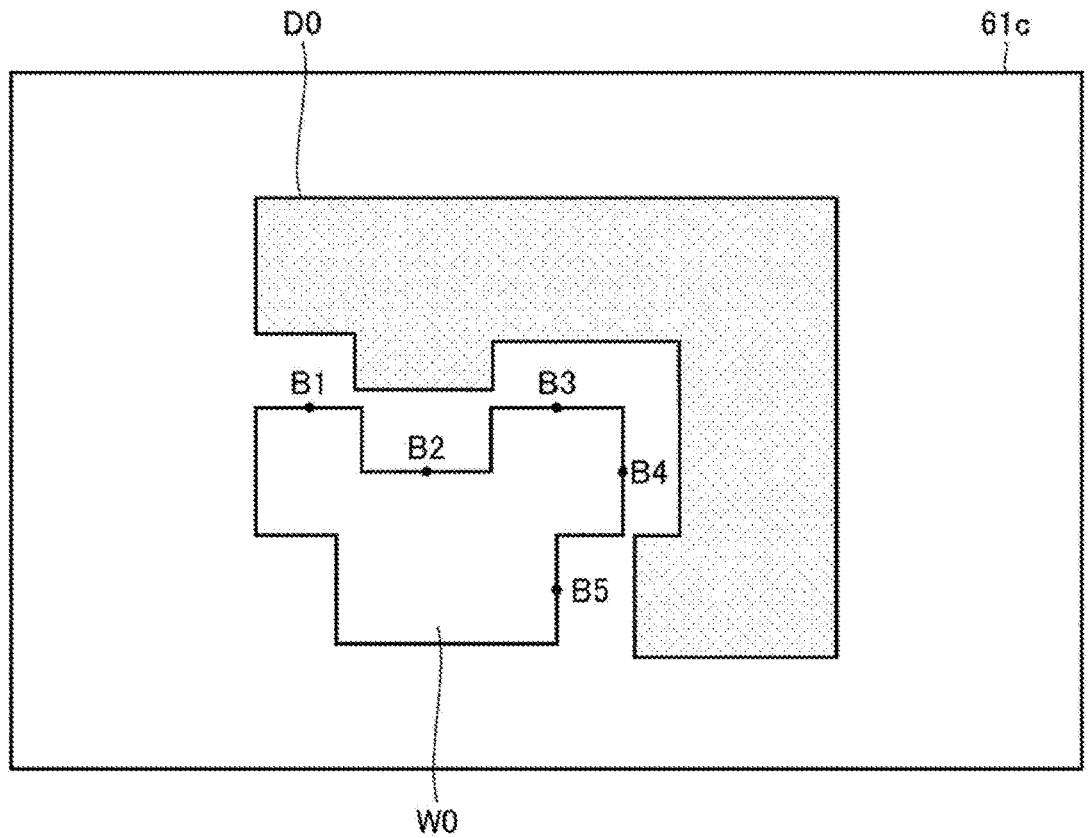
FIG. 19 is a diagram illustrating an example of a screen indicating a movable range of the imaging device when only unfixed shafts are used.

FIG. 19 is a diagram illustrating an example of a screen indicating a movable range of the imaging device 10 when only the unfixed shafts are used. A schematic diagram W0 indicating the appearance of the work W and the movable range D0 of the imaging device 10 when only the unfixed shafts are used are displayed on the screen 61c in the example illustrated in FIG. 19.

Referring back to FIG. 17, subsequently, in step S26, the selection part 65 sets the movable range D1 of the imaging device 10 for avoiding interference from an obstacle object. The selection part 65 sets the movable range D1 in accordance with a user input. For example, the user input the movable range D1 to the input device 167 so that the obstacle object around the work W does not interfere in the imaging device 10 while checking the screen 61b illustrated in FIG. 16. The user designates, for example, a plurality of points on the contour line of the movable range D1 and designates a range surrounding the plurality of designated points as the movable range D1. Step S26 is a process of setting the optional condition c.

Figure 20:
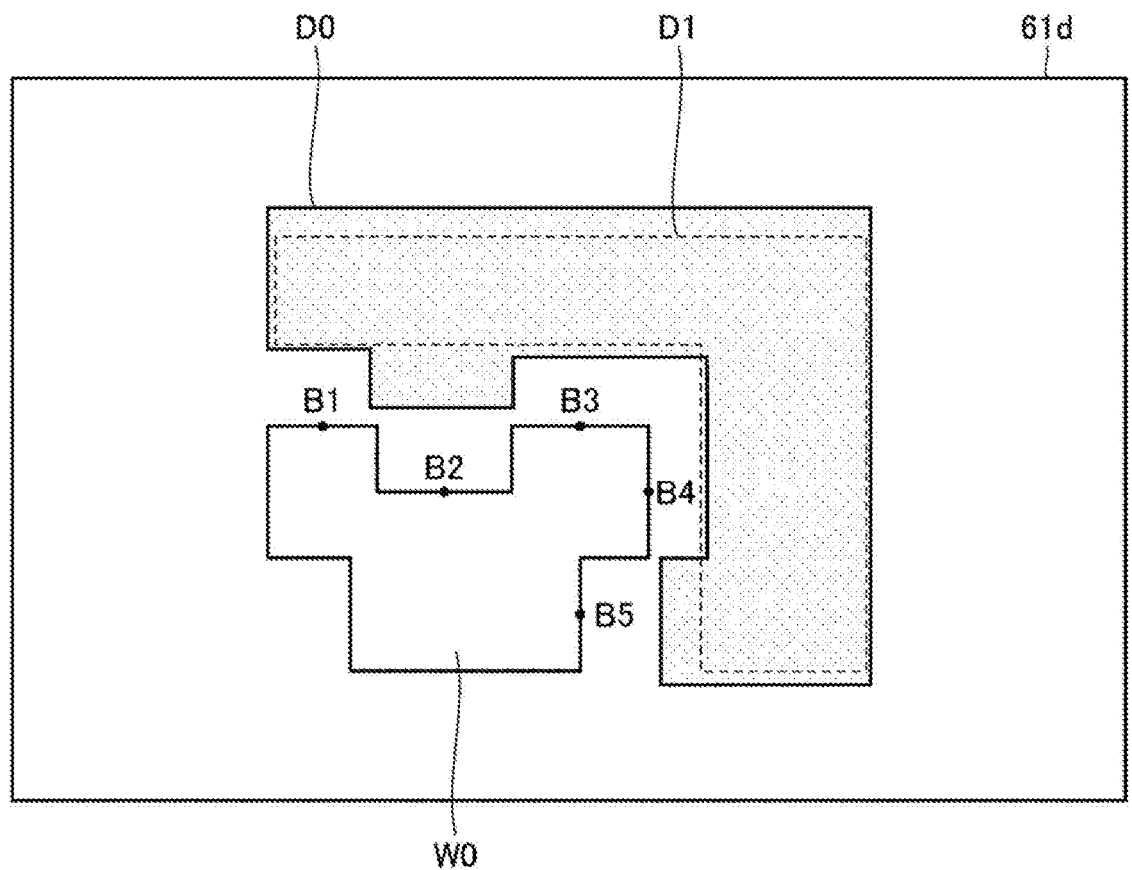
FIG. 20 is a diagram illustrating an example of a screen showing a movable range of the imaging device for avoiding interference from an obstacle object.

FIG. 20 is a diagram illustrating an example of a screen showing a movable range D1 of the imaging device 10 for avoiding interference from an obstacle object. The movable range D0 of the imaging device 10 when only the unfixed shafts are used and the movable range D1 of the imaging device 10 for avoiding interference in the obstacle object are shown on a screen 61d in the example illustrated in FIG. 20.

Referring back to FIG. 17, subsequently, in step S27, the selection part 65 generates a route candidate by selecting the imaging positions one by one from the imaging position candidate group corresponding to the plurality of inspection target positions and connecting the plurality of selected imaging positions in the imaging order. The selection part 65 generates the route candidates by the number of selection patterns of the imaging positions. At this time, the selection part 65 generates the route candidate satisfying the following four conditions for each selection pattern of the imaging positions.

A first condition is a condition that the evaluation value E indicating the maximum curvature is equal to or less than the threshold, as described in the foregoing "(J. Method of selecting destination route by selection part)".

A second condition is a condition (the optical condition a) that the imaging device 10 is moved in the movement mode set in step S23 from the imaging position corresponding to the starting position set in step S21 to the imaging position corresponding to the ending position set in step S22. A third condition is a condition (the optical condition b) that the imaging device 10 is moved within the movable range D0 of the imaging device 10 when only the unfixed shafts set in step S24 are used. A fourth condition is a condition (the optical condition c) that the imaging device 10 is moved within the movable range D1 set in step S26.

Subsequently, in step S28, the selection part 65 selects the route candidate in which the evaluation value E is the minimum as the designation route among the route candidates generated by the number of selection patterns.

Figure 21:
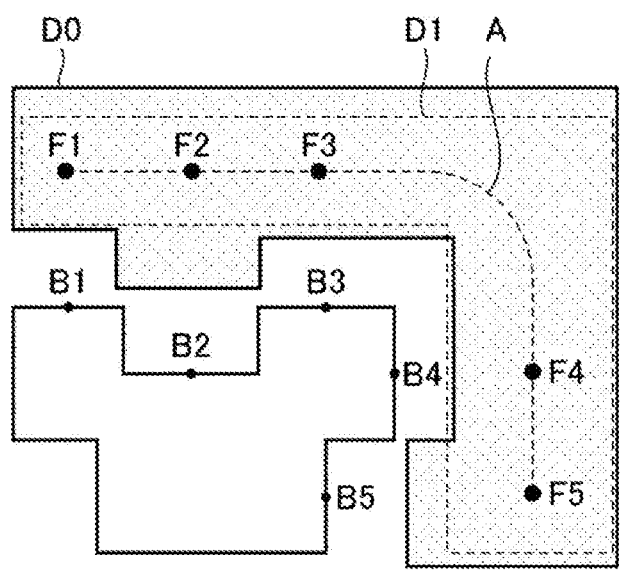
FIG. 21 is a diagram illustrating another example of the designation route selected by the selection part.

FIG. 21 is a diagram illustrating another example of the designation route selected by the selection part 65. FIG. 21 illustrates a designation route A when the optional condition a that the imaging device 10 is moved in the straight line from the inspection target position B1 (the starting position) to the inspection target position B3 (the ending position) among the inspection target positions B1 to B5 illustrated in FIG. 10 is set, and the movable range D0 illustrated in FIG. 18 and the movable range D1 illustrated in FIG. 19 are set. As illustrated in FIG. 21, the imaging device 10 is moved in a straight line to the imaging positions F1 to F3 corresponding to the inspection target positions B1 to B3. Thereafter, the imaging device 10 is smoothly moved from the imaging position F3 corresponding to the inspection target position B3 to the imaging position F5 corresponding to the inspection target position B5.

The flowchart of FIG. 17 illustrates an example of the flow of the process when the optional conditions a to c are all valid. However, at least one of the optional conditions a to c may be set to be invalid. For example, when the optional condition a is set to be invalid, steps S21 to S23 are omitted. When the optical condition b is set to be invalid, step S24 is omitted. When the optical condition c is set to be invalid, step S26 is omitted. In step S27, the route candidate is generated so that the valid optional conditions are satisfied.

L. Modification Examples of Appearance Inspection System

Figure 22:
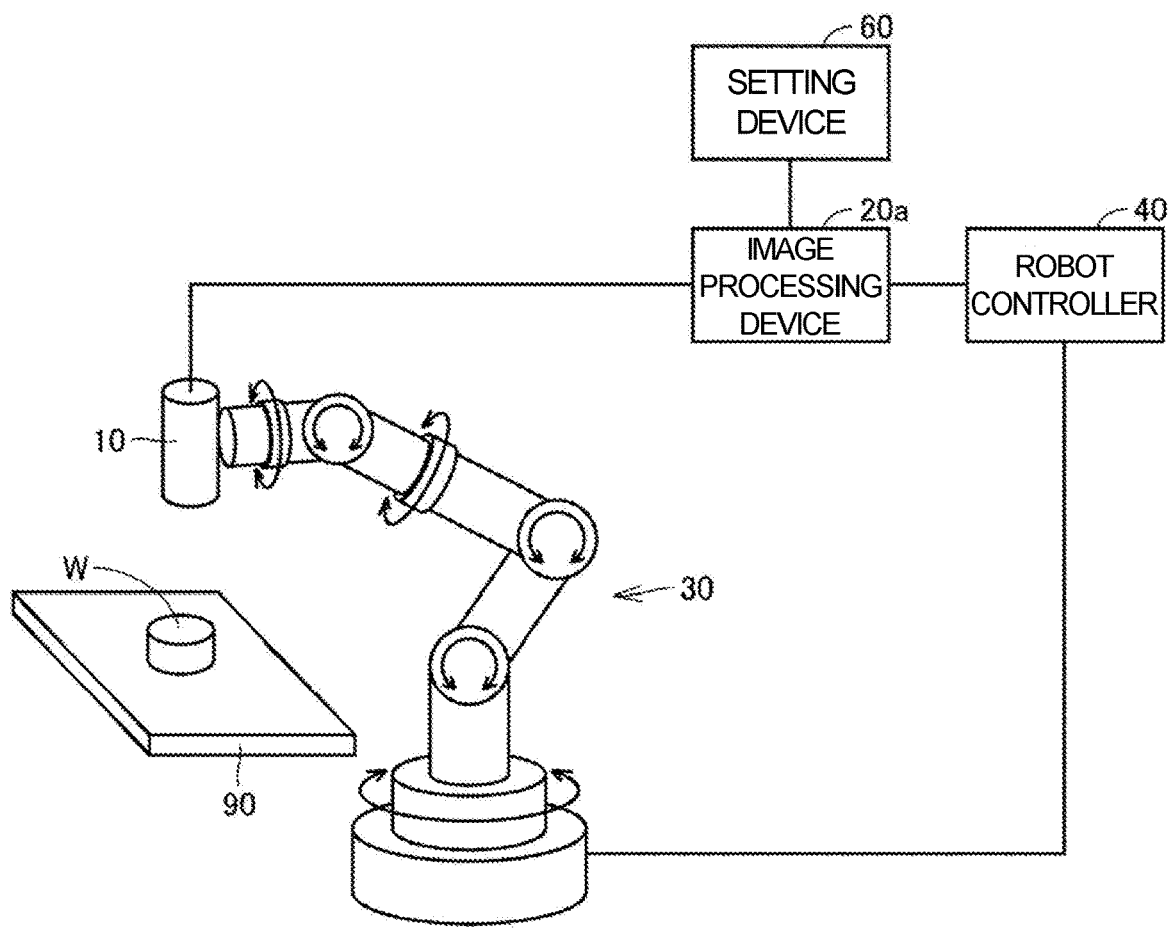
FIG. 22 is a diagram illustrating an appearance inspection system according to a modification example.

FIG. 22 is a diagram illustrating an appearance inspection system according to a modification example. The appearance inspection system illustrated in FIG. 22 is different from the appearance inspection system 1 illustrated in FIG. 1 in that the PLC 50 is not included and an image processing device 20a is included instead of the image processing device 20. The image processing device 20a has both the configuration of the foregoing image processing device 20 and the configuration of the PLC 50.

Figure 23:
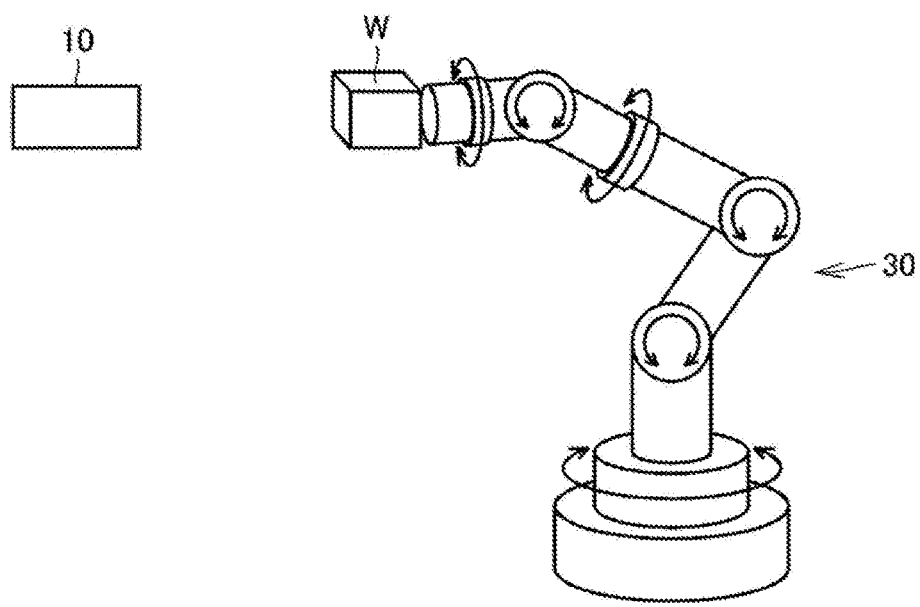
FIG. 23 is a diagram illustrating another form in which a relative position between a workpiece and the imaging device is changed.

FIG. 23 is a diagram illustrating another form in which a relative position between the workpiece W and the imaging device 10 is changed. As illustrated in FIG. 23, the robot 30 may move the workpiece W rather than the imaging device 10. In the example illustrated in FIG. 23, the imaging device 10 is fixed. The relative position between the workpiece W and the imaging device 10 may be changed by moving the workpiece W in this way.

Figure 24:
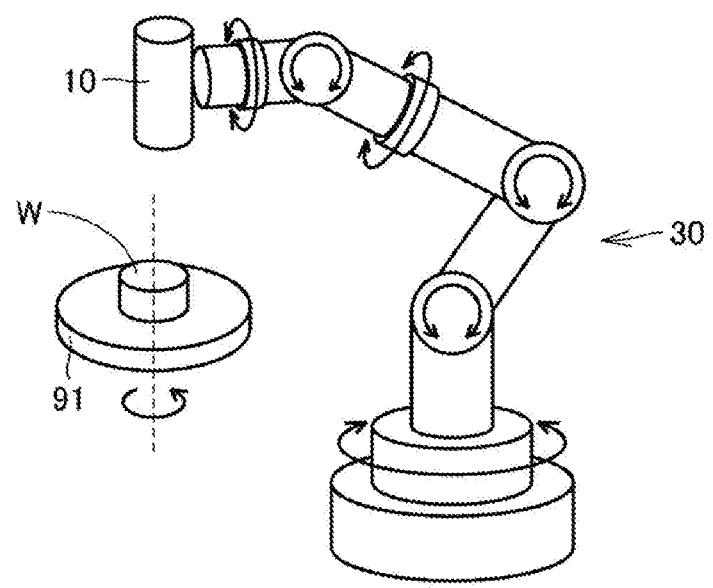
FIG. 24 is a diagram illustrating still another form in which the relative position between the workpiece and the imaging device is changed.

FIG. 24 is a diagram illustrating still another form in which the relative position between the workpiece W and the imaging device 10 is changed. As illustrated in FIG. 24, the workpiece W may be placed on a rotational table 91. The rotational table 91 rotates in response to an instruction from the robot controller 40. Thus, it is possible to easily change the relative position between the workpiece W and the imaging device 10.

The robot 30 may be a robot (for example, a horizontally articulated robot or an orthogonal robot) other than a vertically articulated robot.

M. Modification Examples of Selection Part

As described above, the selection part 65 selects the route candidates in which the maximum curvature is equal to or less than the threshold and the maximum curvature is the minimum as the designation route among the plurality of route candidates generated by sequentially connecting the plurality of imaging positions selected from the plurality of imaging position candidates. However, a method of selecting the designation route in the selection part 65 is not limited thereto. For example, the designation route may be selected in accordance with the following selection methods (a) to (h).

(Selection Method (a))

The selection part 65 may display a plurality of route candidates on the display part 61 and prompt the user to input a selection instruction when there are a plurality of route candidates in which the maximum curvature is equal to or less than the threshold. The selection part 65 selects one of the plurality of route candidates as the designation route in response to the input selection instruction. In this case, the selection part 65 may not calculate the evaluation value E with regard to each of the route candidates in which the maximum curvature is equal to or less than the threshold.

Alternatively, the selection part 65 may select one of the plurality of route candidates as the designation route on the basis of another evaluation value when there are a plurality of route candidates in which the maximum curvature is equal to or less than the threshold. For example, the selection part 65 may select a route candidate in which a route length of the route candidate is the minimum as the designation route. Alternatively, the selection part 65 may select the route candidate in which a time necessary to move the imaging device 10 is the minimum as the designation route. Alternatively, the selection part 65 may select a route candidate in which a value of a derivative (for example, an average value) with respect to a time is the minimum when the imaging device 10 is moved, as the designation route. The value of the derivative is an n-th order differential value with respect to a time of XYZ coordinate values indicating the position of the imaging device 10. For example, the value of the derivative is $dx/dt$, $d^2x/dt^2$, or the like.

(Selection Method (b))

The selection part 65 may select a route candidate in which an average value of curvature is equal to or less than a threshold as the designation route. When there are a plurality of route candidates in which the average value of curvature is equal to or less than the threshold, the selection part 65 may select a route candidate in which the average value of curvature is the minimum as the designation route or may select one of the plurality of route candidates as the designation route in response to a selection instruction input by the user.

Alternatively, when there are a plurality of route candidates in which the average value of curvature is equal to or less than the threshold, the selection part 65 may select one of the plurality of route candidates as the designation route based on another evaluation value. For example, the selection part 65 may select the route candidate in which a route length of the route candidate is the minimum as the designation route. Alternatively, the selection part 65 may select a route candidate in which a time necessary to move the imaging device 10 is the minimum as the designation route.

Alternatively, the selection part 65 may select a route candidate in which a value of a derivative (for example, an average value) for a time when the imaging device 10 is moved is the minimum, as the designation route. The value of the derivative is an n-th order differential value with respect to a time of XYZ coordinate values indicating the position of the imaging device 10. For example, the value of the derivative is $dx/dt$, $d^2x/dt^2$, or the like.

(Selection Method (c))

The selection part 65 may generate not only a first route optimized so that the maximum curvature is equal to or less than a threshold in the entire length but also a second route optimized so that the maximum curvature is equal to or less than the threshold except for some regions and may select either route as the designation route. For example, the selection part 65 selects either the first route or the second route as the designation route in response to an instruction from the user.

The first route is a route in which the maximum curvature of the points P1 to PN is equal to or less than the threshold, as described above.

The second route is a route, for example, a route bent at one spot or a plurality of spots and is a route in which the maximum curvature is equal to or less than the threshold except for the spots. That is, the selection part 65 generates a route in which the maximum curvature of points except for the points including the spots among the points P1 to PN is equal to or less than the threshold as the second route.

Figure 25:
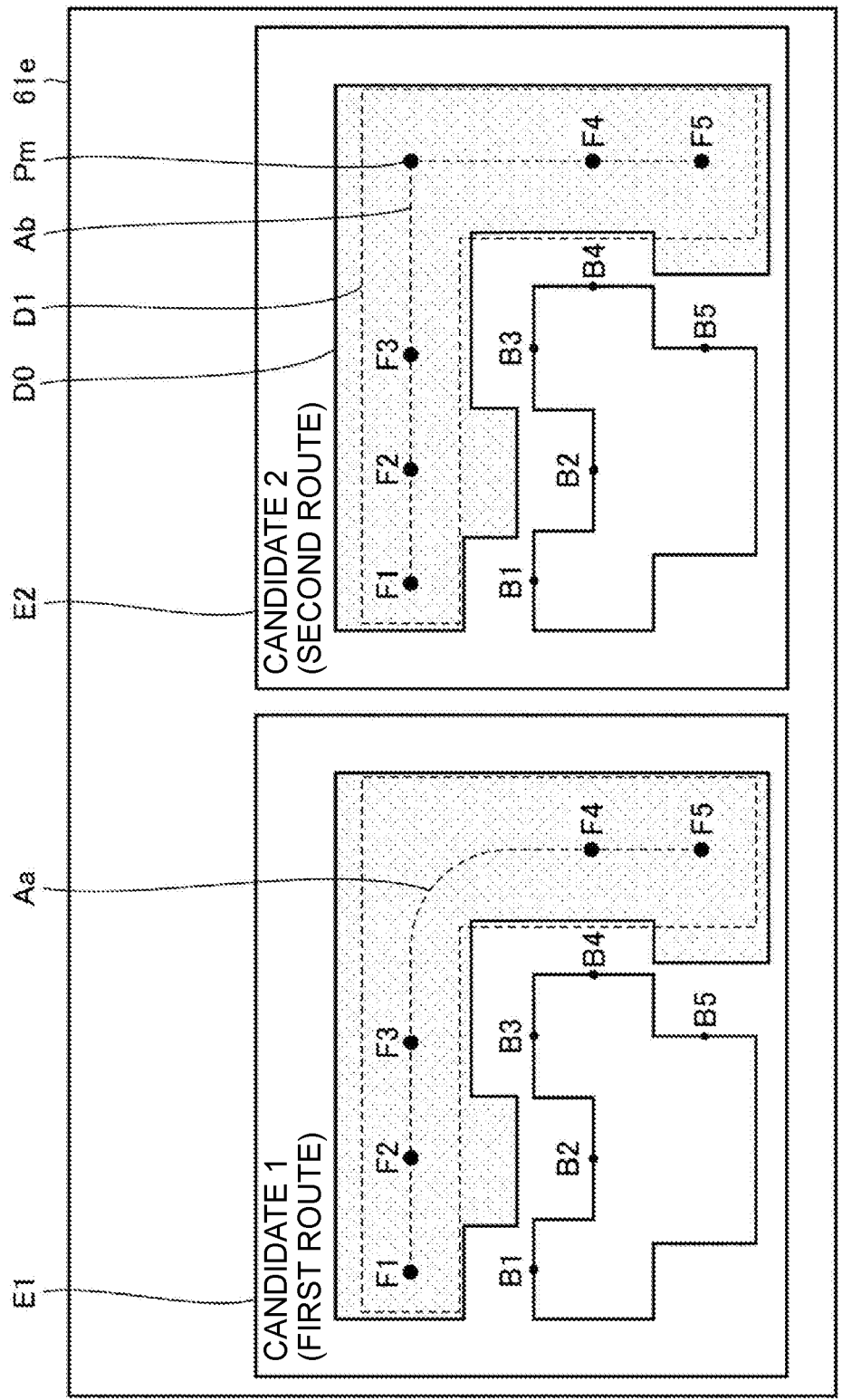
FIG. 25 is a diagram illustrating an example of a screen for prompting selection of a first route and a second route.

FIG. 25 is a diagram illustrating an example of a screen for prompting selection of the first route and the second route. A screen 61e illustrated in FIG. 25 includes a schematic diagram E1 illustrating a first route Aa and a schematic diagram E2 illustrating a second route Ab with regard to the inspection target positions B1 to B5 on the workpiece W illustrated in FIG. 10. The selection part 65 selects either the first route Aa or the second route Ab as the designation route in response to an operation of clicking the schematic diagram E1 or the schematic diagram E2.

In the example illustrated in FIG. 25, a part of a line segment connecting the imaging position F3 to the imaging position F4 is located out of the movable ranges D0 and D1. Therefore, a middle point Pm located between the imaging positions F3 and F4 and within the movable ranges D0 and D1 is set so that the second route Ab bent at the middle point Pm is set.

(Selection Method (d))

The selection part 65 may select a route candidate satisfying another requirement rather than the requirement of the curvature as the designation route. For example, the selection part 65 selects a route candidate in which a route length is equal to or less than a threshold among a plurality of route candidates generated by sequentially connecting a plurality of imaging positions selected from a plurality of imaging position candidates, as the designation route. In this case, the selection part 65 may calculate an evaluation value using an evaluation function including a term that depends on the route length. Thus, based on the evaluation value, the selection part 65 can easily determine whether the route length of the route candidate is equal to or less than the threshold. Further, when there are a plurality of route candidates in which the route length is equal to or less than the threshold, the selection part 65 may select a route candidate in which the evaluation value is the maximum (or the minimum) as the designation route. Alternatively, the selection part 65 may select one of the plurality of route candidates in which the route length is equal to or less than the threshold as the designation route in response to a selection instruction input by the user.

(Selection Method (e))

The selection part 65 may select a route candidate in which a time necessary to change a relative position of the imaging device 10 with respect to the workpiece W (hereinafter simply referred to as a "movement time") is equal to or less than the threshold as the designation route among the plurality of route candidates generated by sequentially connecting the plurality of imaging positions selected from the plurality of imaging position candidates. In this case, the selection part 65 may calculate the evaluation value using an evaluation function including a term that depends on the movement time. Thus, based on the evaluation value, the selection part 65 can easily determine whether the movement time is equal to or less than the threshold. Further, when there are a plurality of route candidates in which the movement time is equal to or less than the threshold, the selection part 65 may select a route candidate in which the evaluation value is the minimum (or the maximum) as the designation route. Alternatively, the selection part 65 may select one of the plurality of route candidates in which the movement time is equal to or less than the threshold as the designation route in response to a selection instruction input by the user.

(Selection Method (f))

The selection part 65 may select a route candidate in which a value of a derivative (for example, an average value) for a time with respect to a time of the relative position of the imaging device 10 with respect to the workpiece W is equal to or less than the threshold as the designation route among the plurality of route candidates generated by sequentially connecting the plurality of imaging positions selected from the plurality of imaging position candidates. In this case, the selection part 65 may calculate the evaluation value using an evaluation function including a term that depends on the derivative. Thus, based on the evaluation value, the selection part 65 can easily determine whether the value of the derivative is equal to or less than a threshold. Further, when there are a plurality of route candidates in which the value of the derivative is equal to or less than the threshold, the selection part 65 may select a route candidate in which the evaluation value is the minimum (or the maximum) as the designation route. Alternatively, the selection part 65 may select one of the plurality of route candidates in which the value of the derivative is equal to or less than the threshold as the designation route in response to a selection instruction input by the user.

(Selection Method (g))

The selection part 65 may select the designation route by combining the foregoing selection methods (d) to (f). Specifically, the selection part 65 calculates the evaluation value using an evaluation function including at least two of the term that depends on the route length of the route candidate, the term that depends on the curvature of the route candidate, the term that depends on the movement time, and the term that depends on the derivative. The selection part 65 selects a route candidate which the evaluation value is equal to or less than the threshold as the designation route. In a case in which there are the route candidates in which the evaluation value is equal to or less than the threshold, the selection part 65 may select a route candidate in which the evaluation value is the minimum (or the maximum) as the designation route. Alternatively, the selection part 65 may select one of the plurality of route candidates in which the evaluation value is equal to or less than the threshold as the designation route in response to a selection instruction input by the user.

(Selection Method (h))

Further, the selection part 65 may select one of the plurality of route candidates generated by sequentially connecting the plurality of imaging positions selected from the plurality of imaging position candidates as the designation route without using the evaluation value. For example, the selection part 65 selects the route candidate satisfying at least one of the following preset requirements (i) and (ii) as the designation route:

the requirement (i): a route be included in a preset space; and the requirement (ii): a combination of control values of the rotational shafts 33a to 33f of the robot 30 be included in a preset range when the robot 30 changes the relative position of the imaging device 10 with respect to the workpiece W along a route.

The space in the requirement (i) is, for example, a space indicated by the movable range D0 set in accordance with the foregoing optional condition b or the movable range D1 set in accordance with the optional condition b.

The requirement (ii) is, for example, a requirement for avoiding a singular point of the robot 30. The singular point is, for example, a point in a state in which the arms 32a to 32f are stretched or a point in a state in which the arms 32a to 32f form a straight line. A range of the combination of the control values for avoiding the singular point is preset. Thus, the robot 30 can smoothly operate.

N. Other Modification Examples

The lens module 12 may not include the zoom adjustment lens group 12b. In this case, a focal distance of the lens module 12 is fixed and the size of the workpiece W within the imaging field of view is varied in accordance with a distance between the imaging position and the workpiece W. However, in a case in which an imaging resolution of the imaging device 10 is relatively high, there is no problem even when the imaging field of view is broadened. Therefore, the candidate decision part 64 can decide the plurality of imaging position candidates.

When R(pix) is a camera resolution and D(mm) is a required minimum defect size, a diameter of the maximum imaging field of view at which a defect of the minimum defect size can be recognized is generally expressed as a×D×R using a proportionality constant a. The candidate decision part 64 may decide a plurality of imaging position candidates with regard to an inspection target position from a range in which an image for recognizing the defect of the minimum defect size D can be captured in accordance with the camera resolution R and the required minimum defect size D of the imaging device 10. That is, the candidate decision part 64 may decide the plurality of imaging position candidates from a range closer to the workpiece W than the maximum distance in which the image for recognizing a defect of the minimum defect size desired to be inspected on the workpiece W can be captured.

As described above, the selection part 65 decides the imaging order of the plurality of inspection target positions before the route candidate is selected. However, the selection part 65 may calculate the evaluation value E for the route candidate when the imaging order of the plurality of inspection target positions are caused to be different and may decide the imaging order based on the evaluation value E.

As described above, the selection part 65 generates the route candidate in which the default position of the imaging device 10 is the starting point. However, the selection part 65 may generate the route candidate in which the first imaging position is the starting point.

O. Operational Effects and Advantages

In the embodiment, as described, the candidate decision part 64 decides the plurality of relative position candidates (the imaging position candidates) of the imaging device 10 with respect to the workpiece W at which focus of the lens module 12 is possible on the inspection target position with regard to each of the plurality of the inspection target positions on the workpiece W. The selection part 65 selects the relative positions (the imaging positions) one by one from corresponding plurality of imaging position candidates for each of the plurality of inspection target positions and selects the route candidate satisfying the preset requirement from the plurality of route candidates generated by sequentially connecting the plurality of selected relative positions as the designation route. The lens control part 16 controls the lens module 12 such that a focus position is changed in accordance with the plurality of inspection target positions when the relative position of the imaging device 10 is caused to be different along the designation route.

The candidate decision part 64 decides the position at which the focus of the lens module 12 is possible on the inspection target position as the imaging position candidate. Therefore, the degree of freedom of the plurality of imaging position candidates is better than when a lens module with a fixed focus position is used. As a result, the selection part 65 can generate more route candidates by connecting imaging positions selected from the plurality of imaging position candidates with the high degree of freedom. The selection part 65 can select the route candidate satisfying the preset requirement from the plurality of route candidates as the designation route. Therefore, the selection part 65 easily sets the route when the workpiece W is imaged while causing the relative position of the imaging device 10 with respect to the workpiece W to be different.

The selection part 65 calculates the evaluation value for evaluating whether the preset requirement is satisfied with regard to each of the plurality of route candidates and selects the designation route based on the calculated evaluation value. Thus, the selection part 65 can easily set the route candidate satisfying the preset requirement as the designation route by using the evaluation value.

The evaluation value is calculated using the evaluation function including at least one of the term that depends on the route length of the route candidate, the term that depends on the curvature of the route candidate, the term that depends on the time necessary to change the relative position (the imaging position) of the imaging device 10 with respect to the workpiece W in accordance with the route candidate, and the term that depends on the derivative with respect to a time of the imaging position with regard to each of the plurality of route candidates. Thus, it is possible to set the designation route satisfying the requirement in consideration of at least one of the route length, the curvature, the time, and the derivative.

The focal distance of the lens module 12 is variable. The lens control part 16 controls the focal distance of the lens module 12 such that the size of a field of view when the imaging device 10 images each of the plurality of inspection target positions is within the pre-decided range. Thus, even when the distance between the imaging position and the workpiece W is varied for each imaging position, the size of the workpiece W in the image captured by the imaging device 10 can be substantially constant.

With regard to each of the plurality of inspection target positions, the candidate decision part 64 decides the plurality of relative positions of the imaging device 10 with respect to the workpiece W at which the pre-decided range including the inspection target positions is within an imaging field of view and focus on the inspection target positions is possible, as the plurality of imaging position candidates. Thus, even when one of the plurality of imaging position candidates is selected as the imaging position, the pre-decided range including the inspection target positions is included in the captured image. As a result, it is easy to inspect the appearance of the workpiece W.

Alternatively, with regard to each of the plurality of inspection target positions, the candidate decision part 64 decides the plurality of relative positions of the imaging device 10 with respect to the workpiece W at which focus on the inspection target position is possible when a focal distance of the lens module 12 is set so that the pre-decided range including the inspection target position is an imaging field of view, as the plurality of imaging position candidates. The lens control part 16 controls the focal distance of the lens module 12 such that the imaging field of view of the imaging device 10 with respect to each of the plurality of inspection target positions is within the pre-decided range. Thus, even when the distance between the imaging position and the workpiece W is varied for each imaging position, the size of the workpiece W in the image captured by the imaging device 10 can be substantially constant.

The robot 30 includes the plurality of rotational shafts 33*a* to 33*f* and changes the relative position of the imaging device 10 with respect to the workpiece W. The selection part 65 selects the designation route so that the designation route passes within the movable range D1 in which the relative position of the imaging device 10 with respect to the workpiece W is taken when only the designated shafts are used among the plurality of rotational shafts 33*a* to 33*f*. Thus, even in a situation in which several shafts are not unfixed among the plurality of rotational shafts 33*a* to 33*f* due to a restriction, it is possible to set the designation route along which the plurality of inspection target positions are sequentially imaged.

The preset requirement includes at least one of a requirement that the designation route be included in a preset space and a requirement that a combination of control values of the plurality of rotational shafts 33*a* to 33*f* is included in a preset range when the robot 30 changes the relative position of the imaging device 10 with respect to the workpiece W along the designation route. Thus, it is possible to set the designation route satisfying the requirement in consideration of an operation of the robot 30.

The imaging processing device 20 includes the determination part 21 that determines quality of appearance of the workpiece W by processing images obtained by imaging the plurality of inspection target positions and the output part 22 that outputs a determination result of the determination part 21. Thus, the user can easily recognize the quality of the appearance of the workpiece W.

The setting device 60 includes the foregoing candidate decision part 64 and the selection part 65. Thus, the setting device 60 easily sets the route when the workpiece W is imaged while causing the relative position of the imaging device 10 with respect to the workpiece W to be different.

P. Supplements

As described above, the embodiments and the modification examples include the following disclosure.
(Configuration 1)

An appearance inspection system (1) that performs appearance inspection by imaging a target (W) using an imaging device (10) while causing a relative position of the imaging device (10) with respect to the target (W) to be different along a designation route, wherein the imaging device (10) includes a lens module (12) with a variable focus position, wherein the appearance inspection system (1) includes:

a decision part (64) that decides a plurality of relative position candidates of the imaging device (10) with respect to the target (W) at which focus of the lens module (12) is possible on the inspection target position with regard to each of a plurality of the inspection target positions on the target (W);

a selection part (65) that selects relative positions one by one from corresponding plurality of relative position candidates for each of the plurality of inspection target positions and selects a route candidate satisfying a preset requirement from a plurality of route candidates generated by sequentially connecting the plurality of selected relative positions as the designation route; and a lens control part that controls the lens module (12) such that a focus position is changed in accordance with the plurality of inspection target positions when the relative position of the imaging device (10) is caused to be different along the designation route.
(Configuration 2)

The appearance inspection system (1) according to Configuration 1, wherein the selection part (65) calculates an evaluation value for evaluating whether the preset requirement is satisfied with regard to each of the plurality of route candidates and selects the designation route based on the calculated evaluation value.
(Configuration 3)

The appearance inspection system (1) according to Configuration 2, wherein the evaluation value is calculated using an evaluation function including at least one of a term that depends on a route length of the route candidate, a term that depends on a curvature of the route candidate, a term that depends on a time necessary to change the relative position of the imaging device (10) with respect to the target (W) in accordance with the route candidate, and a term that depends on a derivative with respect to a time of the relative position of the imaging device (10) with respect to the target (W) with regard to each of the plurality of route candidates.
(Configuration 4)

The appearance inspection system (1) according to any one of Configurations 1 to 3, wherein a focal distance of the lens module (12) is variable, and wherein the lens control part controls the focal distance of the lens module (12) such that an imaging field of view of the imaging device (10) corresponding to each of the plurality of inspection target positions is within a pre-decided range.
(Configuration 5)

The appearance inspection system (1) according to any one of Configurations 1 to 3, wherein, with regard to each of the plurality of inspection target positions, the decision part (64) decides the plurality of relative positions of the imaging device (10) with respect to the target (W) at which a pre-decided range including the inspection target positions is within an imaging field of view and focus on the inspection target positions is possible, as the plurality of relative position candidates.

(Configuration 6)

The appearance inspection system (1) according to any one of Configurations 1 to 3, wherein a focal distance of the lens module (12) is variable, wherein, with regard to each of the plurality of inspection target positions, the decision part (64) decides the plurality of relative positions of the imaging device (10) with respect to the target (W) at which focus on the inspection target position is possible when a focal distance of the lens module (12) is set so that a pre-decided range including the inspection target position is an imaging field of view, as the plurality of relative position candidates, and wherein the lens control part controls the focal distance of the lens module (12) such that the imaging field of view of the imaging device (10) with respect to each of the plurality of inspection target positions is within the pre-decided range.

(Configuration 7)

The appearance inspection system according to any one of Configurations 1 to 6, further including:

a robot that includes a plurality of shafts and changes the relative position of the imaging device (10) with respect to the target (W), wherein the preset requirement includes a requirement that the designation route pass within a range in which the relative position of the imaging device (10) with respect to the target (W) is taken when only a designated shaft is used among the plurality of shafts.

(Configuration 8)

The appearance inspection system (1) according to any one of Configurations 1 to 6, further including:

a robot that includes a plurality of shafts and changes the relative position of the imaging device (10) with respect to the target (W), wherein the preset requirement includes at least one of a requirement that the designation route be included in a preset space and a requirement that a combination of control values of the plurality of shafts be included in a preset range when the robot changes the relative position of the imaging device (10) with respect to the target (W) along the designation route.

(Configuration 9)

An image processing device used in the appearance inspection system (1) according to any one of Configurations 1 to 8, the image processing device including:

a determination part that determines quality of appearance of the target (W) by processing images obtained by imaging a plurality of inspection target positions; and an output part that outputs a determination result of the determination part.

(Configuration 10)

A setting device (60) used in the appearance inspection system (1) according to any one of Configurations 1 to 8, the setting device (60) including:

the determination part (64); and the selection part (65).

(Configuration 11)

An inspection method of performing appearance inspection by imaging a target (W) using an imaging device (10) while causing a relative position of the imaging device (10) with respect to the target (W) to be different along a designation route, wherein the imaging device (10) includes a lens module (12) with a variable focus position, and wherein the inspection method comprises:

deciding a plurality of relative position candidates of the imaging device (10) with respect to the target (W) at which focus of the lens module (12) is possible on the inspection target position with regard to each of a plurality of the inspection target positions on the target (W);

selecting relative positions one by one from corresponding plurality of relative position candidates for each of the plurality of inspection target positions and selecting a route candidate satisfying a preset requirement from a plurality of route candidates generated by sequentially connecting the plurality of selected relative positions as the designation route; and controlling the lens module (12) such that a focus position is changed in accordance with the plurality of inspection target positions when the relative position of the imaging device (10) is caused to be different along the designation route.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An appearance inspection system that performs appearance inspection by imaging a target using an imaging device while causing a relative position of the imaging device with respect to the target to be different along a designation route, wherein the imaging device includes a lens module with a variable focus position, the lens module comprises a focus position adjustment lens and a zoom adjustment lens group, and the focus position adjustment lens and the zoom adjustment lens group are sequentially disposed on a transmission path of a light reflected from the target on the imaging device, wherein the appearance inspection system comprises:

a decision part that decides a plurality of relative position candidates of the imaging device with respect to the target at which focus of the lens module is possible on an inspection target position with regard to each of a plurality of inspection target positions on the target;

a selection part that selects relative positions one by one from corresponding plurality of relative position candidates for each of the plurality of inspection target positions and selects a route candidate satisfying a preset requirement from a plurality of route candidates generated by sequentially connecting the plurality of selected relative positions as the designation route; and a lens control part that controls the lens module such that a focus position is changed in accordance with the plurality of inspection target positions when the relative position of the imaging device is caused to be different along the designation route.

2. The appearance inspection system according to claim 1, wherein the selection part calculates an evaluation value for evaluating whether the preset requirement is satisfied with regard to each of the plurality of route candidates and selects the designation route based on the calculated evaluation value.

3. The appearance inspection system according to claim 2, wherein the evaluation value is calculated using an evaluation function including at least one of a term that depends on a route length of the route candidate, a term that depends on a curvature of the route candidate, a term that depends on a time necessary to change the relative position of the imaging device with respect to the target in accordance with the route candidate, and a term that depends on a derivative with respect to a time of the relative position of the imaging device with respect to the target with regard to each of the plurality of route candidates.

4. The appearance inspection system according to claim 1, wherein a focal distance of the lens module is variable, and
wherein the lens control part controls the focal distance of the lens module such that an imaging field of view of the imaging device corresponding to each of the plurality of inspection target positions is within a pre-decided range.

5. The appearance inspection system according to claim 2, wherein a focal distance of the lens module is variable, and
wherein the lens control part controls the focal distance of the lens module such that an imaging field of view of the imaging device corresponding to each of the plurality of inspection target positions is within a pre-decided range.

6. The appearance inspection system according to claim 3, wherein a focal distance of the lens module is variable, and
wherein the lens control part controls the focal distance of the lens module such that an imaging field of view of the imaging device corresponding to each of the plurality of inspection target positions is within a pre-decided range.

7. The appearance inspection system according to claim 1, wherein, with regard to each of the plurality of inspection target positions, the decision part decides the plurality of relative positions of the imaging device with respect to the target at which a pre-decided range including the inspection target positions is within an imaging field of view and focus on the inspection target positions is possible, as the plurality of relative position candidates.

8. The appearance inspection system according to claim 2, wherein, with regard to each of the plurality of inspection target positions, the decision part decides the plurality of relative positions of the imaging device with respect to the target at which a pre-decided range including the inspection target positions is within an imaging field of view and focus on the inspection target positions is possible, as the plurality of relative position candidates.

9. The appearance inspection system according to claim 3, wherein, with regard to each of the plurality of inspection target positions, the decision part decides the plurality of relative positions of the imaging device with respect to the target at which a pre-decided range including the inspection target positions is within an imaging field of view and focus on the inspection target positions is possible, as the plurality of relative position candidates.

10. The appearance inspection system according to claim 1,
wherein a focal distance of the lens module is variable,
wherein, with regard to each of the plurality of inspection target positions, the decision part decides the plurality of relative positions of the imaging device with respect to the target at which focus on the inspection target position is possible when a focal distance of the lens module is set so that a pre-decided range including the inspection target position is an imaging field of view, as the plurality of relative position candidates, and
wherein the lens control part controls the focal distance of the lens module such that the imaging field of view of the imaging device with respect to each of the plurality of inspection target positions is within the pre-decided range.

11. The appearance inspection system according to claim 2,
wherein a focal distance of the lens module is variable,
wherein, with regard to each of the plurality of inspection target positions, the decision part decides the plurality of relative positions of the imaging device with respect to the target at which focus on the inspection target position is possible when a focal distance of the lens module is set so that a pre-decided range including the inspection target position is an imaging field of view, as the plurality of relative position candidates, and
wherein the lens control part controls the focal distance of the lens module such that the imaging field of view of the imaging device with respect to each of the plurality of inspection target positions is within the pre-decided range.

12. The appearance inspection system according to claim 3,
wherein a focal distance of the lens module is variable,
wherein, with regard to each of the plurality of inspection target positions, the decision part decides the plurality of relative positions of the imaging device with respect to the target at which focus on the inspection target position is possible when a focal distance of the lens module is set so that a pre-decided range including the inspection target position is an imaging field of view, as the plurality of relative position candidates, and
wherein the lens control part controls the focal distance of the lens module such that the imaging field of view of the imaging device with respect to each of the plurality of inspection target positions is within the pre-decided range.

13. The appearance inspection system according to claim 1, further comprising:
a robot that includes a plurality of shafts and changes the relative position of the imaging device with respect to the target,
wherein the preset requirement includes a requirement that the designation route pass within a range in which the relative position of the imaging device with respect to the target is taken when only a designated shaft is used among the plurality of shafts.

14. The appearance inspection system according to claim 2, further comprising:
a robot that includes a plurality of shafts and changes the relative position of the imaging device with respect to the target,
wherein the preset requirement includes a requirement that the designation route pass within a range in which the relative position of the imaging device with respect to the target is taken when only a designated shaft is used among the plurality of shafts.

15. The appearance inspection system according to claim 3, further comprising:
a robot that includes a plurality of shafts and changes the relative position of the imaging device with respect to the target,
wherein the preset requirement includes a requirement that the designation route pass within a range in which the relative position of the imaging device with respect to the target is taken when only a designated shaft is used among the plurality of shafts.

16. The appearance inspection system according to claim 1, further comprising:

a robot that includes a plurality of shafts and changes the relative position of the imaging device with respect to the target, wherein the preset requirement includes at least one of a requirement that the designation route be included in a preset space and a requirement that a combination of control values of the plurality of shafts be included in a preset range when the robot changes the relative position of the imaging device with respect to the target along the designation route.

17. The appearance inspection system according to claim 2, further comprising:

a robot that includes a plurality of shafts and changes the relative position of the imaging device with respect to the target, wherein the preset requirement includes at least one of a requirement that the designation route be included in a preset space and a requirement that a combination of control values of the plurality of shafts be included in a preset range when the robot changes the relative position of the imaging device with respect to the target along the designation route.

18. An image processing device used in the appearance inspection system according to claim 1, the image processing device comprising:

a determination part that determines quality of appearance of the target by processing images obtained by imaging the plurality of inspection target positions; and an output part that outputs a determination result of the determination part.

19. A setting device used in the appearance inspection system according to claim 1, the setting device comprising: the determination part; and
the selection part.

20. An inspection method of performing appearance inspection by imaging a target using an imaging device while causing a relative position of the imaging device with respect to the target to be different along a designation route, wherein the imaging device includes a lens module with a variable focus position, the lens module comprises a focus position adjustment lens and a zoom adjustment lens group, and the focus position adjustment lens and the zoom adjustment lens group are sequentially disposed on a transmission path of a light reflected from the target on the imaging device, wherein the inspection method comprises:

deciding a plurality of relative position candidates of the imaging device with respect to the target at which focus of the lens module is possible on an inspection target position with regard to each of a plurality of inspection target positions on the target;

selecting relative positions one by one from corresponding plurality of relative position candidates for each of the plurality of inspection target positions and selecting a route candidate satisfying a preset requirement from a plurality of route candidates generated by sequentially connecting the plurality of selected relative positions as the designation route; and controlling the lens module such that a focus position is changed in accordance with the plurality of inspection target positions when the relative position of the imaging device is caused to be different along the designation route.

* * * * *